United States Patent [19]

Tsushima et al.

[11] Patent Number: 5,051,846
[45] Date of Patent: Sep. 24, 1991

[54] MAGNETIC VIDEO TAPE RECORDING AND REPRODUCING APPARATUS

[75] Inventors: Takuya Tsushima, Ayase; Akira Hirota, Chigasaki; Naomichi Nishimoto, Tokyo; Takashi Uchimi, Yokohama, all of Japan

[73] Assignee: Victor Company of Japan, Ltd., Yokohama, Japan

[21] Appl. No.: 253,868

[22] Filed: Oct. 5, 1988

[30] Foreign Application Priority Data

Oct. 13, 1987 [JP] Japan ................................ 62-256365
Oct. 13, 1987 [JP] Japan ................................ 62-256368
Oct. 13, 1987 [JP] Japan ................................ 62-256369

[51] Int. Cl.$^5$ .......................................... H04N 5/782
[52] U.S. Cl. .................................. 360/19.1; 358/341; 358/343; 360/64
[58] Field of Search ....................... 358/335, 341, 343; 360/14.1–14.2, 18, 19.1, 21, 23, 32, 64, 84

[56] References Cited

U.S. PATENT DOCUMENTS

| | | | |
|---|---|---|---|
| 4,303,950 | 12/1981 | Taniguchi et al. | 360/19.1 |
| 4,477,844 | 10/1984 | Nakano et al. | 360/19.1 X |
| 4,607,293 | 8/1986 | Okada et al. | 358/343 X |
| 4,660,103 | 4/1987 | Wilkinson et al. | 358/343 X |
| 4,660,104 | 4/1987 | Higurashi | 358/343 X |
| 4,682,245 | 7/1987 | Shibata et al. | 358/343 X |
| 4,743,977 | 5/1988 | Yoshioka et al. | 358/343 X |
| 4,812,921 | 3/1989 | Mitsuhashi et al. | 358/343 |
| 4,819,089 | 4/1989 | Wilkinson et al. | 360/19.1 X |
| 4,849,831 | 7/1989 | Hino | 358/343 X |
| 4,858,032 | 8/1989 | Okada et al. | 358/343 X |

FOREIGN PATENT DOCUMENTS 0090582 10/1983 European Pat. Off. .
0206752 12/1986 European Pat. Off. .

OTHER PUBLICATIONS

Patent Abstracts of Japan, vol. 87, No. 241 (P-232), [1386], 10/26/73, & JP 58-128004.

*Primary Examiner*—Robert L. Richardson
*Assistant Examiner*—W. R. Young
*Attorney, Agent, or Firm*—Lowe, Price, LeBlanc & Becker

[57] ABSTRACT

A magnetic tape is wound on a rotary drum through a predetermined angular range greater than a standard tape winding angle. The predetermined angular range has a first portion corresponding to the standard tape winding angle and a second portion extending outward of the first portion. A main information signal is recorded into a main information recording track on the magnetic tape which extends in a region corresponding to the first portion of the predetermined angular range. A sub information signal is recorded into a sub information recording track on the magnetic tape which extends along an extension line of the main information recording track and which extnds in a region corresponding to the second portion of the predetermined angular range. A plurality of magnetic heads have different track widths respectively and are mounted on the rotary drum. The magnetic heads form respective different tracks which together constitute the sub information recording track.

12 Claims, 17 Drawing Sheets

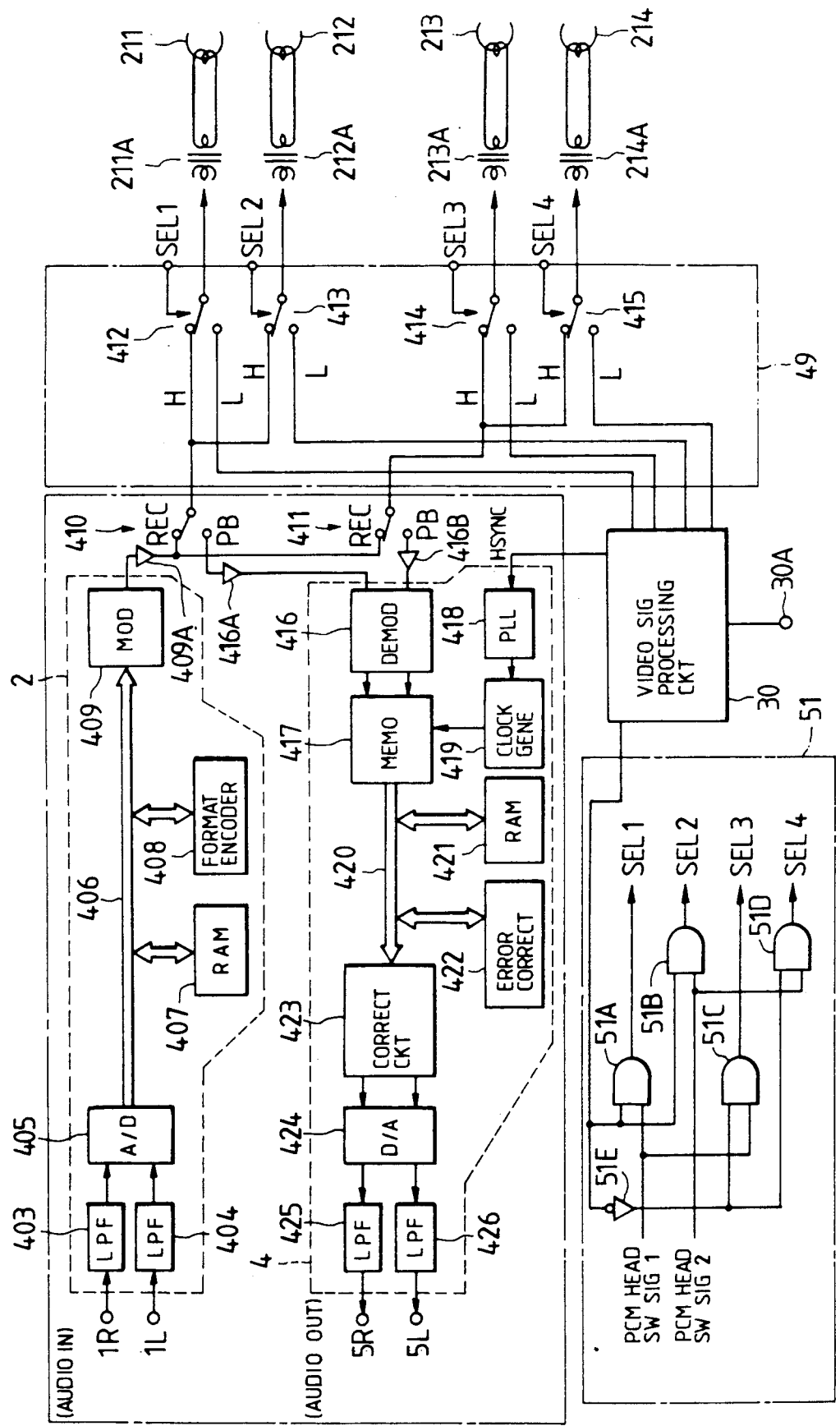

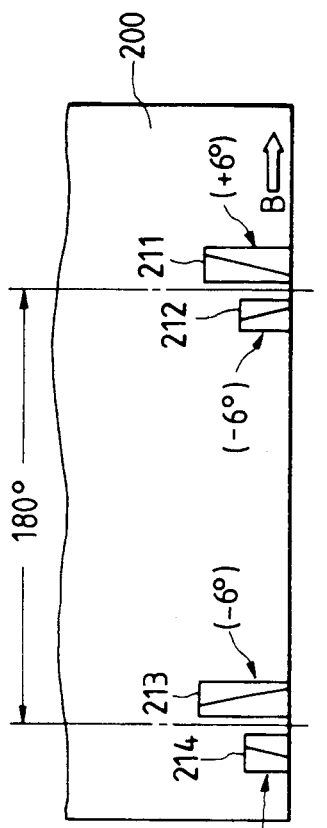
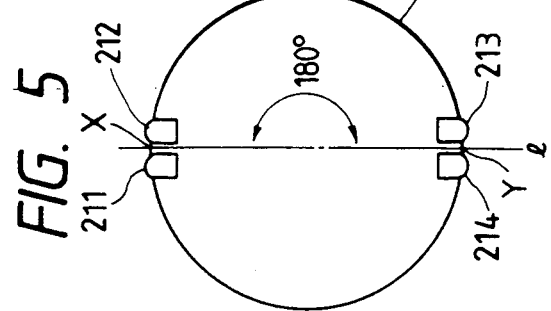
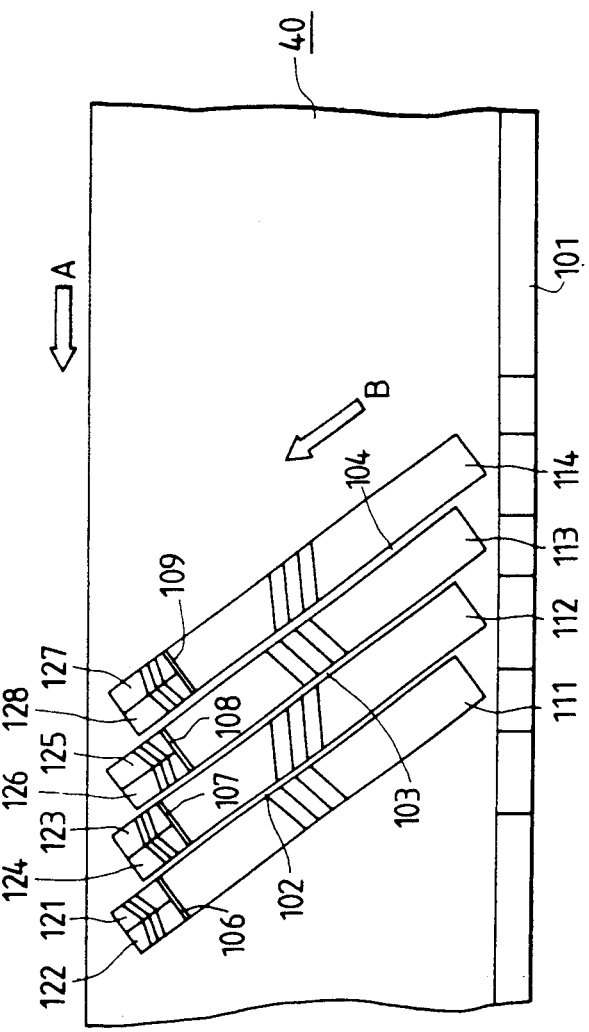

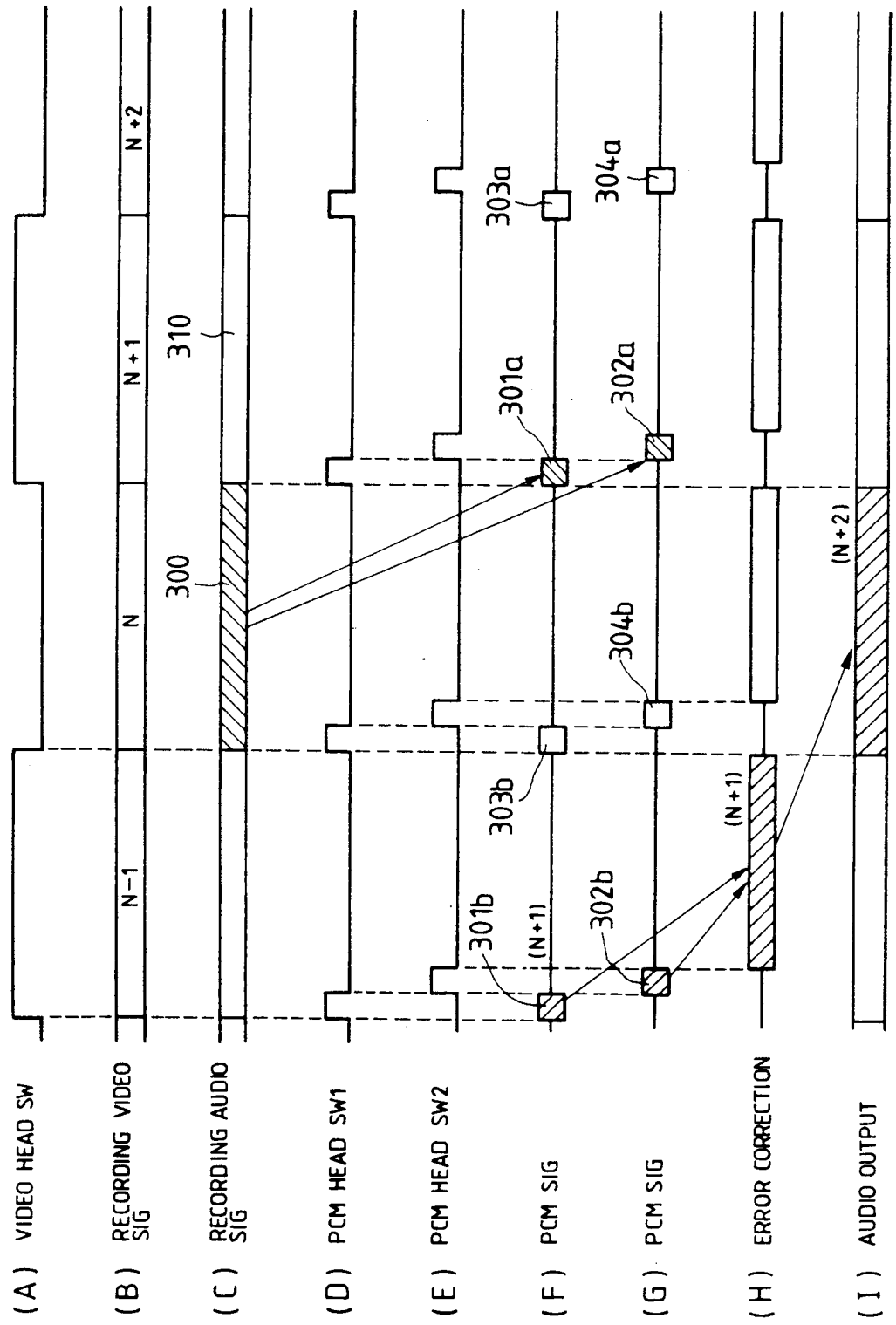

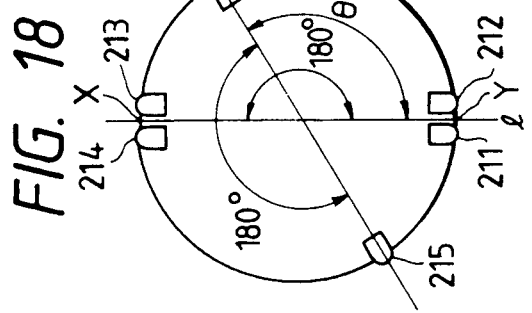

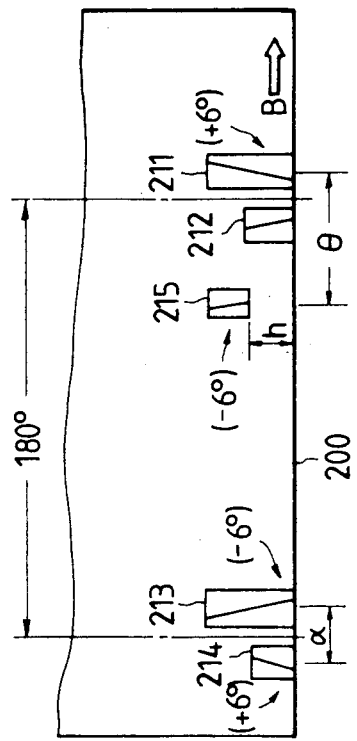
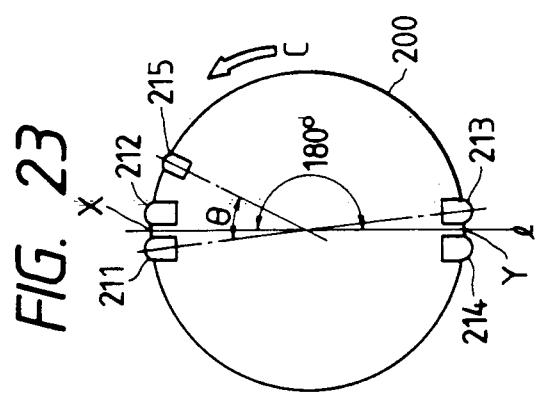
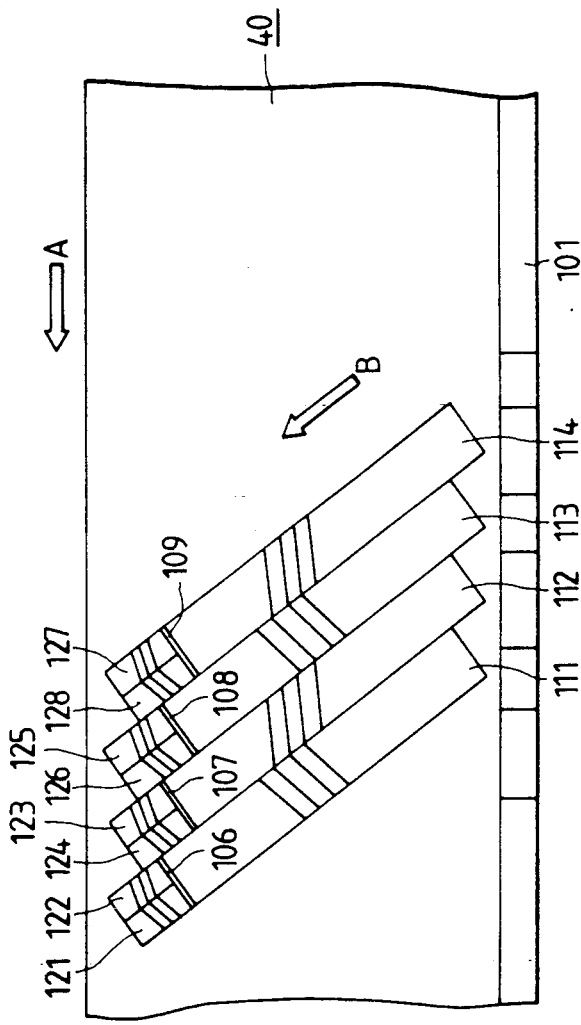
FIG. 24
FIG. 23
FIG. 25

MAGNETIC VIDEO TAPE RECORDING AND REPRODUCING APPARATUS

BACKGROUND OF THE INVENTION

1. Field of the Invention

This invention generally relates to a magnetic recording and reproducing apparatus such as a video tape recorder (VTR). This invention specifically relates to a VTR designed so that an audio signal is recorded on an extended portion of a video signal recording track.

2. Description of the Prior Art

In advanced small VTRs such as 8-mm VTRs, an audio signal is converted into a corresponding digital signal which is recorded on and reproduced from a magnetic tape. The digitization of the audio signal aims at a high quality of reproduced sounds. As will be described hereinafter, in such prior art VTRs, the density of recording of an audio signal tends to be inadequate to high fidelity.

SUMMARY OF THE INVENTION

It is an object of this invention to provide a magnetic recording and reproducing apparatus which enables a high density of recording of a sub information signal such as an audio signal.

It is another object of this invention to provide a high fidelity magnetic recording and reproducing apparatus.

In an apparatus according to a general aspect of this invention, a magnetic tape is wound on a rotary drum through a predetermined angular range greater than a standard tape winding angle. The predetermined angular range has a first portion corresponding to the standard tape winding angle and a second portion extending outward of the standard tape winding angle. A main information signal is recorded into a main information recording track on the magnetic tape which extends in a region corresponding to the first portion of the predetermined angular range. A sub information signal is recorded into a sub information recording track on the magnetic tape which extends along an extension line of the main information recording track and which extends in a region corresponding to the second portion of the predetermined angular range. A plurality of magnetic heads have different track widths respectively and are mounted on the rotary drum. The magnetic heads form respective different tracks which together constitute the sub information signal recording track.

BRIEF DESCRIPTION OF THE DRAWINGS

FIG. 4 is a block diagram of a magnetic recording and reproducing apparatus according to a first embodiment of this invention.

FIG. 5 is a plan view of a rotary drum and magnetic heads in the embodiment of FIG. 4.

FIG. 6 is a developed side view of the rotary drum and the magnetic heads in the embodiment of FIG. 4.

FIG. 7 is a diagram of a track pattern formed on a magnetic tape during a standard-play recording mode of operation of the embodiment of FIG. 4.

FIG. 8(A-I) is a timing diagram of various signals and processes in standard-play recording and reproducing modes of operation of the embodiment of FIG. 4.

FIG. 18 is a plan view of a rotary drum and magnetic heads in the embodiment of FIG. 17.

FIG. 19 is a developed side view of the rotary drum and the magnetic heads in the embodiment of FIG. 17.

FIG. 20 is a diagram of a track pattern formed on a magnetic tape during a standard-play recording mode of operation of the embodiment of FIG. 17.

FIG. 23 is a plan view of a rotary drum and magnetic heads in the embodiment of FIG. 22.

FIG. 24 is a developed side view of the rotary drum and the magnetic heads in the embodiment of FIG. 22.

FIG. 25 is a diagram of a track pattern formed on a magnetic tape during a standard-play recording mode of operation of the embodiment of FIG. 22.

Like and corresponding elements are basically denoted by the same reference characters throughout the drawings.

DESCRIPTION OF THE PREFERRED EMBODIMENTS

Before the description of embodiments of this invention, a prior art VTR will be explained hereinafter for a better understanding of this invention.

Figure 1:
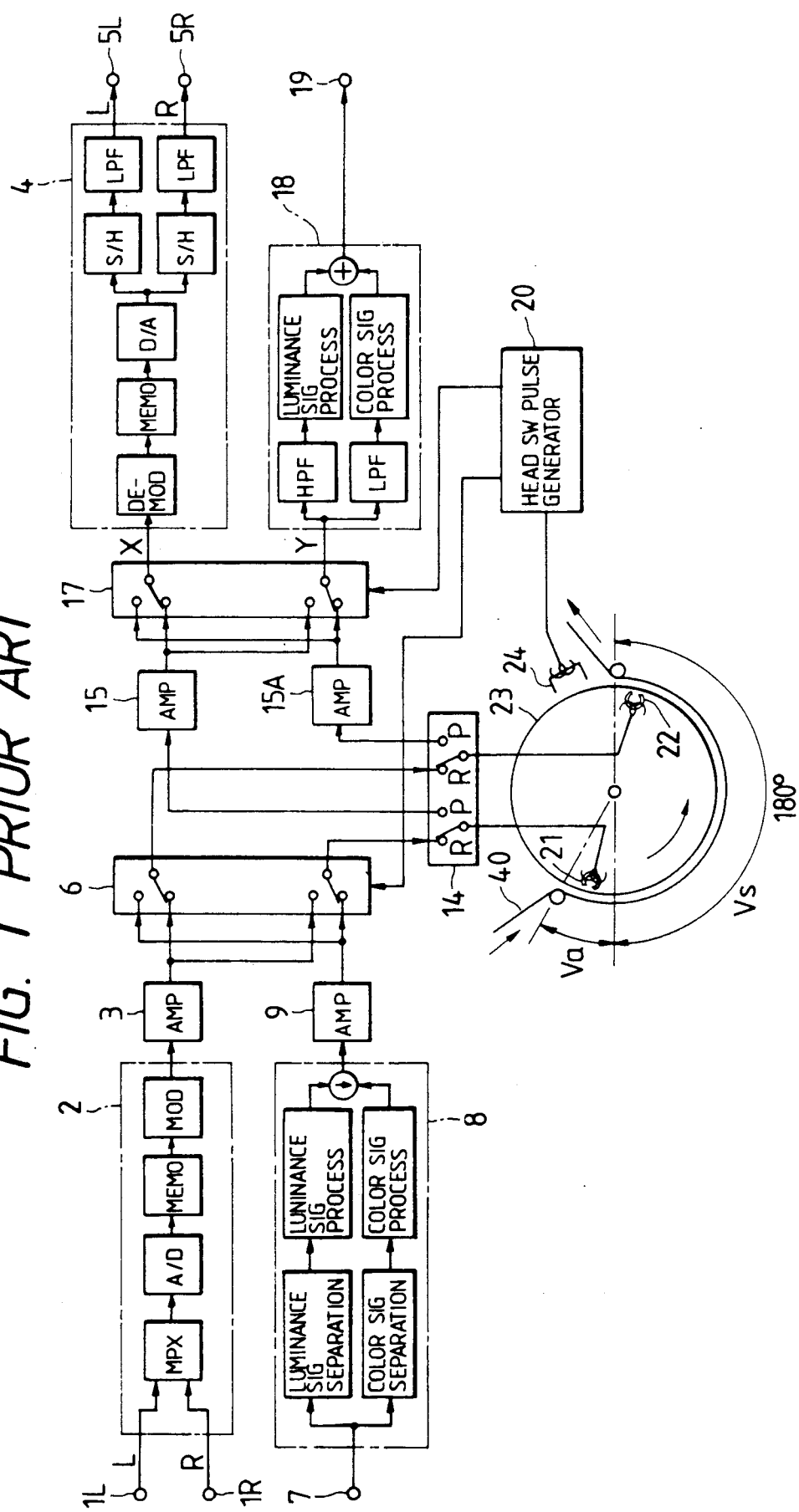
FIG. 1 is a block diagram of a prior art VTR.

As shown in FIG. 1, a prior art VTR includes stereo audio input terminals 1L and 1R receiving a left channel audio signal and a right channel audio signal respectively. An audio signal record processing circuit 2 samples the input audio signals and processes the sampled signals through various steps such as analog-to-digital conversion, time division multiplexing, and time base compression. During a recording mode of operation of the VTR, an output signal from the audio signal record processing circuit 2 is transmitted to magnetic heads 21 and 22 via an audio recording amplifier 3, and switches 6 and 14 before being recorded on a magnetic tape 40.

The prior art VTR includes a video input terminal 7 receiving a video signal. A video signal record processing circuit 8 processes the input video signal through various steps such as a step of separating the input video signal into a luminance signal and a color signal, a frequency modulation of the luminance signal, a frequency down conversion of the color signal, and a step of combining the processed luminance signal and the processed color signal into a processed video signal. During the recording mode of operation of the VTR, an output signal from the video signal record processing circuit 8 is transmitted to the magnetic heads 21 and 22 via a video recording amplifier 9, and the switches 6 and 14 before being recorded on the magnetic tape 40.

The magnetic heads 21 and 22 are mounted on a rotary drum 23. The magnetic heads 21 and 22 are mutually spaced by an angle of 180° with respect to the rotary drum 23. The magnetic tape 40 is obliquely wound on a part of the circumference of the rotary drum 23 which corresponds to a predetermined tape winding angle greater than 180°, for example, which corresponds to 216°. The tape winding angle is divided into a standard part Vs equal to 180° and an additional part Va equal to 36° for example.

The phase of rotation of the rotary drum 23 is sensed by an angular position detector 24. A head switch pulse generation circuit 20 outputs a control pulse signal to the switch 6 in response to an output signal from the angular position detector 24. The switch 6 changes between a first state and a second state in accordance with the control pulse signal. During the recording mode of operation of the VTR, when the switch 6 assumes the first state, the switch 6 connects the magnetic heads 21 and 22 to the video recording amplifier 9 and the audio recording amplifier 3 respectively. When the switch 6 assumes the second state, the switch 6 reverses the connection so that the magnetic heads 21 and 22 are connected to the audio recording amplifier 3 and the video recording amplifier 9 respectively.

Figure 2:
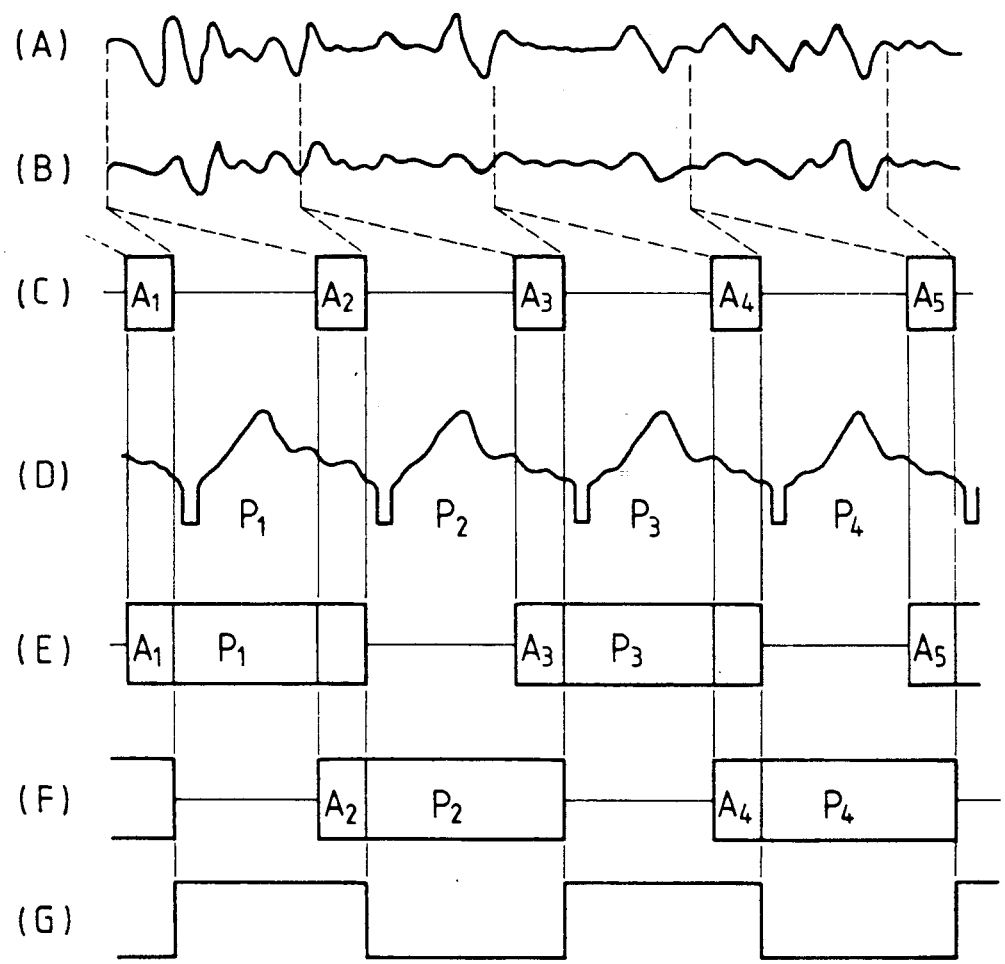
FIG. 2(A-G) is a timing diagram of various signals and processes in the prior art VTR of FIG. 1.

In the prior art VTR of FIG. 1, the left channel audio signal and the right channel audio signal take waveforms as shown by FIGS. 2(A) and 2(B) respectively. The audio signal record processing circuit 2 derives a digital audio signal from the two channel analog audio signals. As shown by FIG. 2(C), the digital audio signal has information blocks A1, A2, A3, ... time compressed and spaced at equal intervals. The video signal takes a waveform as shown by FIG. 2(D). The video signal includes segments P1, P2, P3, ... spaced at equal intervals. The control pulse signal applied to the switch 6 takes a waveform as shown by FIG. 2(G). During the recording mode of operation of the VTR, the switch 6 changes the connections among the magnetic heads 21 and 22, and the recording amplifiers 3 and 9 in response to the control pulse signal so that alternate audio signal blocks A1, A3, A5, ... and alternate video signal segments P1, P3, P5, are sequentially transmitted to one of the magnetic heads 21 and 22 as shown by FIG. 2(E) and that alternate audio signal blocks A2, A4, A6, ... and alternate video signal segments P2, P4, P6, ... are sequentially transmitted to the other magnetic head as shown by FIG. 2(F).

Video signal segments P1, P2, P3, ... are recorded on the magnetic tape 40 when the magnetic heads 21 and 22 scan portions of the magnetic tape 40 which correspond to the standard part Vs of the tape wound angle, that is, an angle of 180° with respect to the rotary drum 23. Audio signal blocks A1, A2, A3, ... are recorded on the magnetic tape 40 when the magnetic heads 21 and 22 scan portions of the magnetic tape 40 which correspond to the additional part Va of the tape winding angle, that is, an angle of, for example, 36° with respect to the rotary drum 23.

Figure 3:
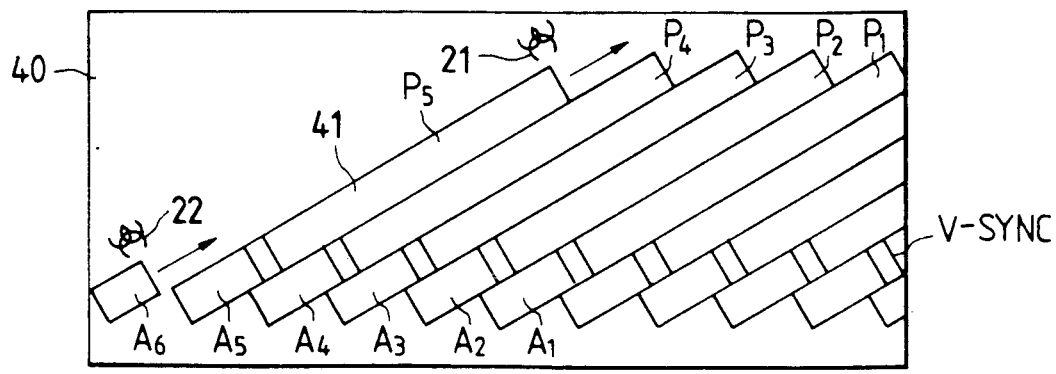
FIG. 3 is a diagram of a recording pattern formed on a magnetic tape in the prior art VTR of FIG. 1.

During the recording mode of operation of the VTR, as shown in FIG. 3, video signal segments P1, P2, P3, ... and audio signal blocks A1, A2, A3, ... are sequentially paired and recorded along respective inclined tracks 41 on the magnetic tape 40. Video signal segments P1, P2, P3, ... are recorded in upper portions of tracks. Audio signal blocks A1, A2, A3, ... are recorded in lower portions of tracks. In each of tracks, an audio signal block is recorded before a video signal segment is recorded with respect to the head scanning.

In the prior art VTR of FIG. 1, during a playback mode of operation, the magnetic heads 21 and 22 reproduce video and audio signals from the magnetic tape 40. The reproduced video and audio signals are transmitted to a switch 17 via the switch 14 and reproducing amplifiers 15 and 15A. The head switch pulse generation circuit 20 outputs a control pulse signal to the switch 17 in response to the output signal from the angular position detector 24. The switch 17 is changed in accordance with the control pulse signal so that the reproduced audio signal and the reproduced video signal can be separated and supplied to an audio signal reproduction processing circuit 4 and a video signal reproduction processing circuit 18 respectively.

The audio signal reproduction processing circuit 4 derives a left channel audio signal and a right channel audio signal from the reproduced audio signal through signal processing opposite to the signal processing in the audio signal record processing circuit 2. The left channel audio signal and the right channel audio signal are transmitted from the audio signal reproduction processing circuit 4 to audio output terminals 5L and 5R respectively.

The video signal reproduction processing circuit 18 separates the reproduced video signal into a frequency modulated luminance signal and a down coverted color signal. In this processing circuit 18, the frequency modulated luminance signal is demodulated while the down converted color signal is subjected to frequency up conversion, and the resulting luminance and color signals are combined into a video signal. The video signal is transmitted from the video signal reproduction processing circuit 18 to a video output terminal 19.

As understood from the previous description, in the prior art VTR of FIG. 1, an audio signal is recorded in audio tracks extending along extended portions of respective video tracks. An example of such configuration is disclosed in the Japanese laid-open patent application 240784-1986. Since the recording of the audio signal into the magnetic tape is performed when the magnetic heads 21 and 22 scan portions of the magnetic tape 40 which correspond to the additional part Va of the tape winding angle, the available track area for the audio signal is considerably limited and the density of recording of the audio signal tends to be inadequate to high fidelity when a total available track area for video and audio is given.

Magnetic recording and reproducing apparatuses according to embodiments of this invention will be described hereinafter with reference to drawings.

FIG. 4 shows a magnetic recording and reproducing apparatus according to a first embodiment of this invention. In the magnetic recording and reproducing apparatus of FIG. 4, a right channel analog audio signal and a left channel analog audio signal are inputted into an audio signal record processing circuit 2 via input terminals 1R and 1L. The audio signal record processing circuit 2 includes a combination of an analog-to-digital (A/D) converter 405, a random access memory (RAM) 407, a format encoder 408, and a modulator 409. The input two channel analog audio signals are transmitted to the A/D converter 405 via low pass filters (LPFs) 403 and 404. In the A/D converter 405, the two channel analog audio signals are processed through time division multiplexing and are converted into a corresponding digital signal. The digital audio signal which represents audio data is outputted to a data bus 406.

The audio data are written into the RAM 407 via the data bus 406. During the data write into the RAM 407, addresses outputted from an address generator (not shown) are designated so that the audio data can be interleaved. The audio data are transferred from the RAM 407 to the format encoder 408 via the data bus 406. The format encoder 408 generates error correction and detection codes in correspondence with the audio data. It should be noted that the encoding format of the encoder 408 is one of the industrial standards. The error correction and detection codes are outputted to the data bus 406 and are written into storage locations of the RAM 407 other than storage locations holding the audio data.

Audio data corresponding one field of a video signal, and related error correction and detection codes are read out from the RAM 407 and are transmitted to the modulator 409 via the data bus 406. The speed of the data readout from the RAM 407 is set equal to the speed of the signal recording on a magnetic tape 40 (see FIG. 7) so that the audio data and the error correction and detection codes can be compressively recorded into the magnetic tape. The digital audio signal, which contains the audio data and the error correction and detection codes, is modulated into a PCM audio signal by the device 409 so as to match the record and reproduction characteristics of rotary transformers 211A-214A, magnetic heads 211-214, and the magnetic tape 40 (see FIG. 7). The PCM audio signal is outputted from the modulator 409 to switches 410 and 411 via a recording amplifier 409A. The switches 410 and 411 serve to change a recording mode and a playback mode.

During the recording mode of operation of the apparatus, "REC" contacts are selected in the switches 410 and 411 so that the PCM audio signal is further transmitted to switches 412-415 within a signal change section 49. The switches 412-415 are connected to the magnetic heads 211-214 via the rotary transformers 211A-214A respectively. The switches 412-415 are changed by control signals SEL1-SEL4 outputted from a signal change control section 51. For example, during a standard-play recording mode of operation of the apparatus, the switches 412-415 are changed at timings as shown in FIGS. 8(A), 8(D), and 8(E) so that the PCM audio signal is sequentially supplied to the magnetic heads 211-214 via the rotary transformers 211A-214A. The PCM audio signal is recorded on the magnetic tape 40 (see FIG. 7) via the magnetic heads 211-214.

During a standard-play or long-play recording mode of operation of the apparatus, a conventional video signal processing circuit 30 receives a video signal through a terminal 30A and outputs the video signal to two of the switches 412-415. The switches 412-415 select the PCM audio signals and the video signals and pass the selected signals to the magnetic heads 211-214 via the rotary transformers 211A-214A in response to the control signals SEL1-SEL4 from the signal change control section 51. Accordingly, the video signal and the PCM audio signals are recorded on the magnetic tape 40 (see FIG. 7). The control signals SEL1-SEL4 to the switches 412-415 are generated by the signal change control section 51 in accordance with PCM head switching pulse signals SW1 and SW2 of FIGS. 8(D) and 8(E) and with a video head switching pulse signal of FIG. 8(A) which is outputted from the video signal processing circuit 30.

During a standard-play playback mode of operation of the apparatus, PCM audio signals are reproduced from the magnetic tape 40 (see FIG. 7) via the magnetic heads 211-214. The reproduced PCM audio signals are selected by the switches 412-415 at timings as shown in FIGS. 8(A), 8(D), and 8(E) and are sequentially transmitted to a demodulator 416 within an audio signal reproduction processing circuit 4 via the switches 410 and 411 and reproducing amplifiers 416A and 416B. It should be noted that contacts "PB" are selected in the switches 410 and 411 during the playback mode of operation. The reproduced PCM audio signals are demodulated by the device 416 into a digital audio signal containing audio data and related error correction and detection codes. In the audio signal reproduction processing circuit 4, the digital audio signal from the demodulator 416 is written into a memory 417. Reference clocks fed to the memory 417 are produced by a combination of a PLL (phase locked loop) circuit 418 and a clock generation circuit 419 on the basis of a horizontal sync signal fH in a video signal which is simultaneously reproduced via the video signal processing circuit 30.

The audio data and the error correction and detection codes are transferred from the memory 417 to a RAM 421 via a data bus 420. An error correction circuit 422 checks the audio data in the RAM 421 and corrects an error or errors in the audio data by referring to the error correction and detection codes. In this way, the audio data in the RAM 421 are substantially cleared of errors. However, it should be noted that some errors can not be corrected by the error correction circuit 422. Such errors are corrected by a correction circuit 423 through an average value interpolation or other known processes. The clean audio data are transferred from the RAM 421 to the correction circuit 423 via the data bus 420. After the correction circuit 423 begins the data time base back to the original data time base and separates the audio data into two parts corresponding to the right channel and the left channel respectively, the correction circuit 423 supplies the audio data to a digital-to-analog (D/A) converter 424. The audio data are transformed by the D/A converter 424 into corresponding two channel analog audio signals, which are transmitted to audio output terminals 5R and 5L via low pass filters (LPF) 425 and 426 respectively. The low pass filters 425 and 426 remove unnecessary high frequency components from the analog audio signals.

During a standard-play or long-play playback mode of operation of the apparatus, video signals are reproduced from the magnetic tape 40 (see FIG. 7) via two of the magnetic heads 211-214. The reproduced video signals are transmitted via two of the switches 412-415 to the video signal processing circuit 30. The video signal processing circuit 30 derives a composite video signal from the reproduced video signals. In addition, the video signal processing circuit 30 extracts a horizontal sync signal from the video signals and outputs the extracted horizontal sync signal to the PLL circuit 418.

As shown in FIG. 5, the magnetic heads 211-214 are mounted on a rotary drum 200 designed to rotate in a direction C. The magnetic tape 40 (see FIG. 7) is obliquely wound on a part of the circumference of the rotary drum 200 which corresponds to a predetermined tape winding angle greater than a standard tape winding angle. The predetermined tape winding angle is divided into a standard part corresponding to the standard tape winding angle and an additional part extending outward of the standard tape winding angle. When the standard tape winding angle is substantially equal to 180°, the additional part may be approximately 20° for example. The magnetic heads 211 and 212 are located near a point X of an intersection between a circumference and a diametrical line 1 with respect to the rotary drum 200. The magnetic heads 213 and 214 are located near a point Y of an opposite intersection between the circumference and the diametrical line 1. Accordingly, the magnetic heads 211 and 212 are close to each other. The magnetic heads 213 and 214 are close to each other. The magnetic heads 211 and 213 are spaced by an angle of 180° with respect to the rotary drum 200. Similarly, the magnetic heads 212 and 214 are spaced by an angle of 180° with respect to the rotary drum 200. The magnetic heads 211, 212, 213, and 214 are designed for a first channel in a standard play (SP) mode, a second channel in a extended play (EP) mode, a second channel in the SP mode, and a first channel in the EP mode, respectively. As shown in FIG. 6, the first channel SP head 211 and the first channel EP head 214 have azimuth angles of +6°. The second channel EP head 212 and the second channel SP head 213 have azimuth angles of −6°. The SP heads 211 and 213 have a standard width which is approximately twice the width of the EP heads 212 and 214. Lower edges of the magnetic heads 211-214 are essentially at a common height measured along an axis of the rotary drum 200. It should be noted that, in FIG. 6, the arrow B denotes a head running direction. The arrangement of the rotary drum 200 and the magnetic heads 211-214 corresponds to the arrangement of a rotary drum and magnetic heads in a conventional VHS system, i.e. one of the industry standard systems.

As shown in FIG. 7, a control track 101 is formed along an edge of the magnetic tape 40. The control track holds a control signal which is used in tracking control during the playback mode of operation of the apparatus. In FIG. 7, the arrow A denotes a tape running direction, and the arrow B denotes a head scanning direction. During the standard-play playback mode of operation of the apparatus, inclined video tracks are formed by the SP heads 211 and 213 on the magnetic tape 40 in regions corresponding to the standard part of the predetermined tape winding angle. The reference numerals 111-114 denote some of these video tracks. Audio tracks are formed by the magnetic heads 211-214 on the magnetic tape 40 in regions corresponding to the additional part of the predetermined tape winding angle. The reference numerals 121-128 denote some of these audio tracks. A pair of audio tracks reside in an area extending along an extended portion of each of the video tracks.

During the standard-play signal recording into the magnetic tape 40, the SP head 211 forms the video track 111 and then leaves a narrow guard band 106. After the resulted formation of the guard band 106, the SP head 211 forms the audio track 121. The first channel or left channel PCM audio signal is recorded on the audio track 121. At this moment, the width of the audio track 121 is equal to the width of the video track 111. Immediately after the formation of the audio track 121, the EP head 212 forms the audio track 122 on a half of the audio track 121 while overwriting a new PCM audio signal on the previously-recorded PCM audio signal. As a result, a total width of the audio tracks 121 and 122 is substantially maintained to be equal to the width of the video track 111. Similarly, the SP head 213 forms the video track 112, a guard band 107, and the audio track 123. Immediately after the formation of the audio track 123, the EP head 214 forms the audio track 124 on a half of the audio track 123 while overwriting a new PCM audio signal on the previously-recorded PCM audio signal. Such processes are periodically reiterated, so that the video tracks 113 and 114, guard bands 108 and 109, and the audio tracks 125-128 are formed. Although some audio tracks having the same azimuth angles are adjacent to each other as shown in FIG. 7, the guard bands which extend between the adjacent audio tracks decrease crosstalk therebetween to an acceptable level.

As shown in FIG. 4, a signal change control section 51 includes gates 51A-51D and an inverter 51E. First input terminals of the gates 51A and 51B are subjected to a video head switching pulse signal (see FIG. 8(A)) supplied from the video signal processing circuit 30. Second input terminals of the gates 51A and 51B are subjected to PCM head switching pulse signals SW1 and SW2 (see FIGS. 8(D) and 8(E)) respectively. The gates 51A and 51B output the control signals SEL1 and SEL2 to the switches 412 and 413 respectively. The video head switching signal (see FIG. 8(A)) is also applied to an input terminal of the inverter 51E. First input terminals of the gates 51C and 51D are subjected to an output signal from the inverter 51E. Second input terminals of the gates 51C and 51D are subjected to the PCM head switching pulse signals SW1 and SW2 respectively. The gates 51C and 51D output the control signals SEL3 and SEL4 to the switches 414 and 415 respectively. In this way, the signal change control section 51 generates the control signals SEL1-SEL4 in accordance with the video head switching signal (see FIG. 8(A)) and the PCM head switching signals SW1 and SW2 (see FIGS. 8(D) and 8(E)).

Figure 9:
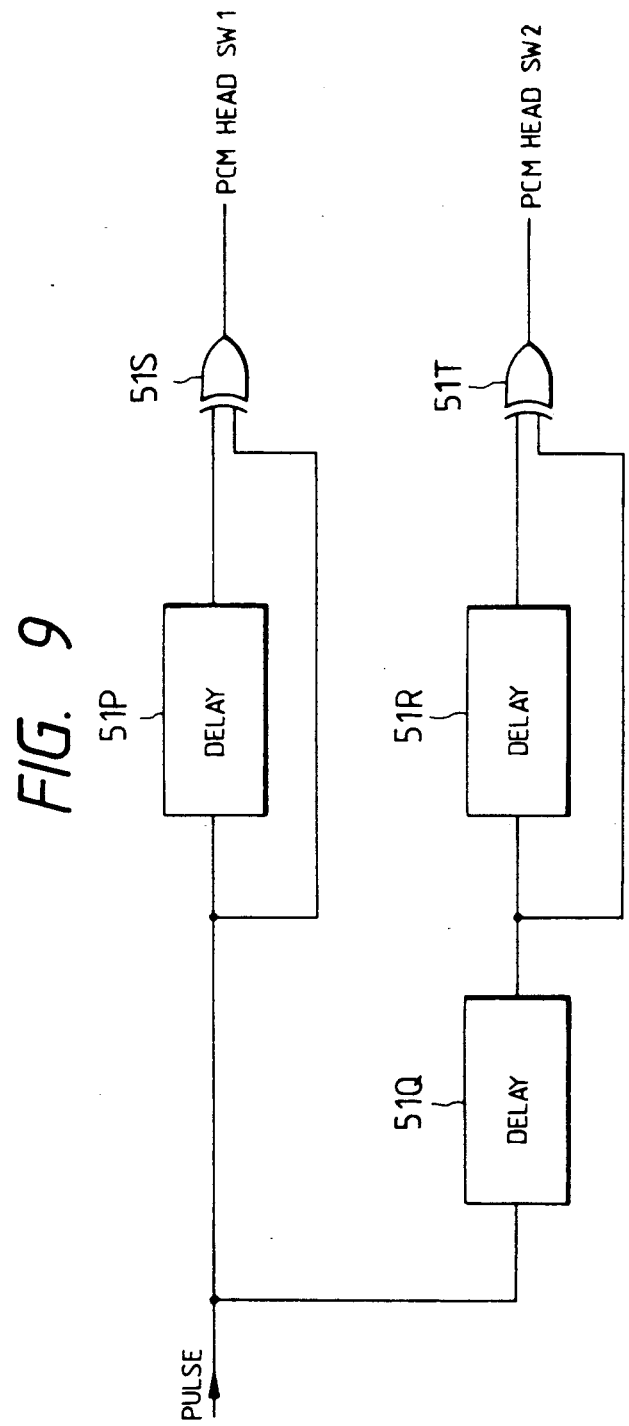
FIG. 9 is a block diagram of a circuit for generating PCM head switching signals in the embodiment of FIG. 4.

As shown in FIG. 9, a circuit for generating the PCM head switching pulse signals SW1 and SW2 includes delay devices 51P-51R and gates 51S and 51T. An output pulse signal from a known flip-flop (not shown), which is generated in response to drum pulses synchronous with rotation of the drum 200 (see FIG. 5), is applied to the delay devices 51P and 51Q and a first input terminal of the gate 51S. The device 51P delays the input pulse signal by a time equal to a period during which the PCM audio signal corresponding to a half of one field is recorded. An output signal from the delay device 51P is applied to a second input terminal of the gate 51S. The gate 51S outputs the PCM head switching pulse signal SW1 (see FIG. 8(D)). The device 51Q delays the input pulse signal by a time corresponding to a gap distance between the magnetic heads 211 and 212 or a gap distance between the magnetic heads 213 and 214. An output signal from the delay device 51Q is applied to the delay device 51R and a first input terminal of the gate 51T. The device 51R delays the input pulse signal by a time equal to a period during which the PCM audio signal corresponding to a half of one field is recorded. An output signal from the delay device 51R is applied to a second input terminal of the gate 51T. The gate 51T outputs the PCM head switching pulse signal SW2 (see FIG. 8(E)).

The operation of the magnetic recording and reproducing apparatus of FIG. 4 will be further described.

During the standard-play recording mode of operation of the apparatus, an N-th field of the video signal shown in FIG. 8(B) is recorded via the first channel SP head 211 so that the video track 111 (see FIG. 7) is formed. After the formation of the video track 111, an (N+1)-th field of the video signal of FIG. 8(B) is recorded via the second channel SP head 213 so that the video track 112 (see FIG. 7) is formed. As shown in FIGS. 8(C), 8(F), and 8(G), the portion 300 of the audio signal, which corresponds to the N-th field of the video signal, is compressed into portions 301a and 302a of the PCM audio signal. At a beginning of the formation of the video track 112 (see FIG. 7), the portions 301a and 302a of the PCM audio signal are sequentially recorded via the magnetic heads 211 and 212 so that the audio tracks 121 and 122 (see FIG. 7) are sequentially formed. In this way, after the first channel SP head 211 forms the video track 111, the same SP head 211 is still used to form the audio track 121. As shown in FIGS. 8(D)-8(G), the timings of recording of the PCM audio signal portions 301a and 302a are determined by the timings of the PCM head switching pulses SW1 and SW2 respectively. Specifically, when both of the video head switching signal of FIG. 8(A) and the PCM head switching signal SW1 of FIG. 8(D) assume high level states, the control signal SEL1 operates the switch 412 to pass the PCM audio signal portion 301a to the magnetic head 211 so that the PCM audio signal portion 301a is recorded via the magnetic head 211. When both of the video head switching signal of FIG. 8(A) and the PCM head switching pulse SW2 of FIG. 8(E) assume high level states, the control signal SEL2 operates the switch 413 to pass the PCM audio signal portion 302a to the magnetic head 212 so that the PCM audio signal portion 302a is recorded via the magnetic head 212.

After the formation of the video track 112, an (N+2)-th field of the video signal is recorded by the first channel SP head 211 into a video track 113. As shown in FIGS. 8(C), 8(F), and 8(G), the portion 310 of the audio signal, which corresponds to the (N+1)-th field of the video signal, is compressed into portions 303a and 304a of the PCM audio signal. At a beginning of the formation of the video track 113, the portions 303a and 304a of the PCM audio signal are sequentially recorded via the magnetic heads 213 and 214 so that the audio tracks 123 and 124 (see FIG. 7) are formed. As shown in FIGS. 8(D)-8(G), the timings of recording of the PCM audio signal portions 303a and 304a are determined by the timings of the PCM head switching pulses SW1 and SW2 respectively. Specifically, when the video head switching signal of FIG. 8(A) assumes a low level state but the PCM head switching signal SW1 of FIG. 8(D) assumes a high level state, the control signal SEL3 operates the switch 414 to pass the PCM audio signal portion 303a to the magnetic head 213 so that the PCM audio signal portion 303a is recorded via the magnetic head 213. When the video head switching signal of FIG. 8(A) assumes a low level state but the PCM head switching signal SW2 of FIG. 8(E) assumes a high level state, the control signal SEL4 operates the switch 414 to pass the PCM audio signal portion 304a to the magnetic head 214 so that the PCM audio signal portion 304a is recorded via the magnetic head 214.

During the standard-play playback mode of operation of the apparatus, activated magnetic heads are selected in accordance with the video head switching signal (see FIG. 8(A)) and the PCM heads switching signals SW1 and SW2 (see FIGS. 8(D) and 8(E)) in a manner similar to the magnetic head selection during the standard-play recording mode of operation. As shown in FIGS. 8(F) and 8(G), portions 301b and 302b of a recorded PCM audio signal are sequentially reproduced via the magnetic heads 211 and 212 respectively. As shown in FIG. 8(H), during a period subsequent to the reproduction of the recorded PCM audio signal portion 302b, the audio data represented by the PCM audio signal portions 301b and 302b are subjected to the error detection and correction process. As shown in FIG. 8(I), during a period subsequent to the period of the error detection and correction process, the error-corrected reproduced audio signal corresponding to the PCM audio signal portions 301b and 302b is outputted. Similarly, subsequent portions 303b and 304b of the recorded PCM audio signal are sequentially reproduced via the magnetic heads 213 and 214 respectively and are subjected to the error detection and correction process.

During a long-play recording mode of operation of the apparatus, the EP heads 212 and 214 are used in place of the SP heads 211 and 213. After the EP head 212 or 214 forms a video track, the same EP head records a PCM audio signal forming an audio track in a region extending from the video track. A single audio track is formed in a region extending from each video track. A double mode, one of the long-play modes, is realized by transporting the magnetic tape 40 at a half of a standard mode tape speed. A three-times mode, one of the long-play modes, is realized by transporting the magnetic tape 40 at one third of the standard mode tape speed. In the case of the three-times mode, although adjacent tracks contact side by side or overlap each other, azimuth angles of the adjacent tracks are different from each other so that degradation by crosstalk between the adjacent tracks caused in the reproduced signals remains within an allowable small degree.

Figure 10:
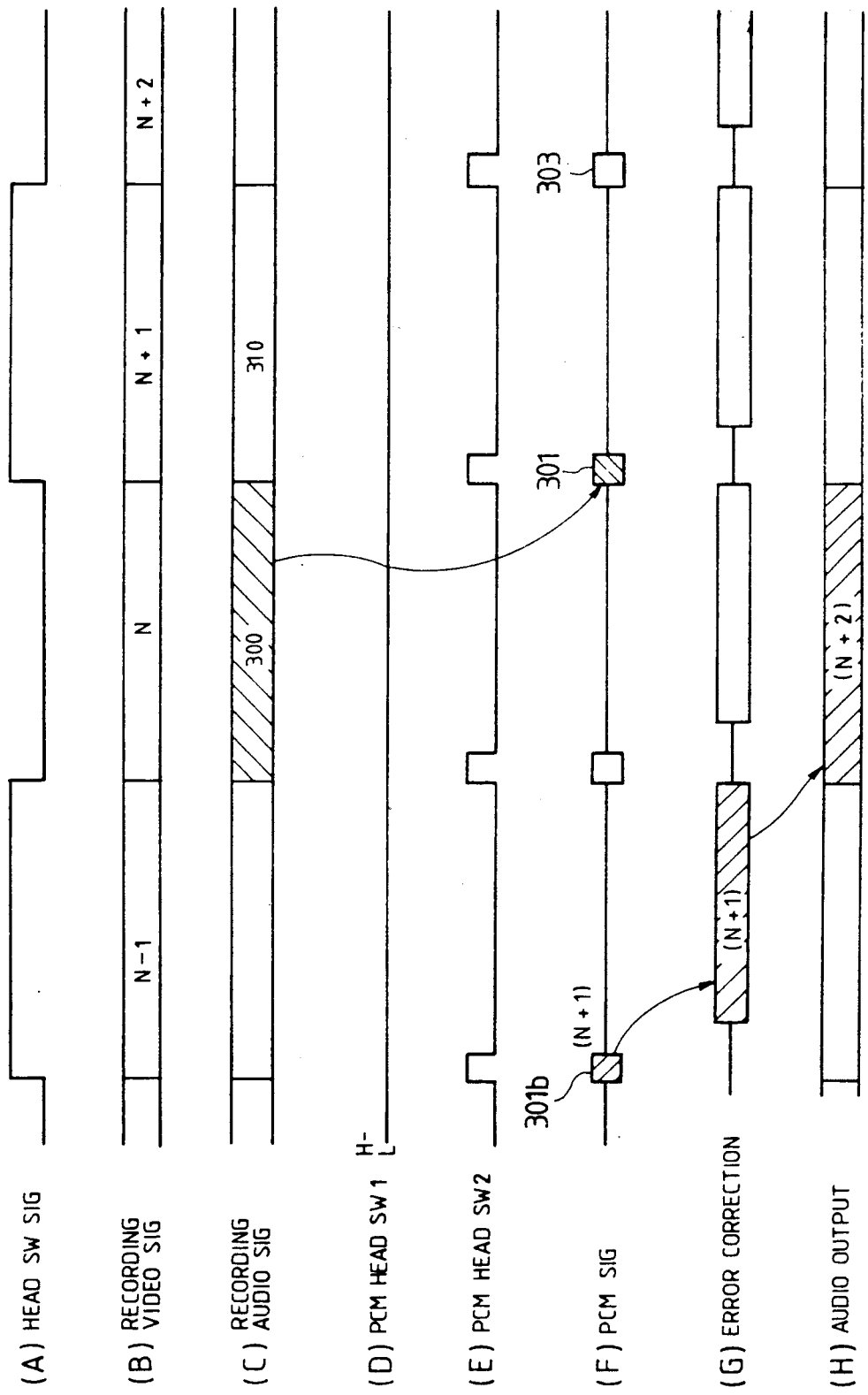
FIG. 10(A-H) is a timing diagram of various signals and processes in long-play recording and reproducing modes of operation of the embodiment of FIG. 4.

As shown in FIG. 10, during the long-play recording mode of operation of the apparatus, the first channel EP head 212 records an N-th field of a video signal and thus forms an N-th field video track. After the formation of the N-th field video track by the EP head 212, the second channel EP head 214 records an (N+1)-th field of the video signal and thus forms an (N+1)-th field video track. A portion 300 of an audio signal which corresponds to the N-th field video signal is compressed into a PCM audio signal 301. At a beginning of the formation of the (N+1)-th video track by the second channel EP head 214, the first channel EP head 212 is still operating to record the PCM audio signal 301. In other words, after the first channel EP head 212 forms the N-th field video track, the same EP head records the PCM audio signal 301 and thus forms an audio track in a region extending from the N-th field video track.

After the formation of the (N+1)-th field video track by the EP head 214, the first channel EP head 212 records an (N+2)-th field of the video signal and thus forms an (N+2)-th field video track. A portion 310 of the audio signal which corresponds to the (N+1)-th field video signal is compressed into a PCM audio signal 303. At a beginning of the formation of the (N+2)-th video track by the first channel EP head 212, the second channel EP head 214 is still operating to record the PCM audio signal 303. In other words, after the second channel EP head 214 forms the (N+1)-th field video track, the same EP head records the PCM audio signal 303 and thus forms an audio track in a region extending from the (N+1)-th field video track. Such processes are periodically reiterated so that subsequent video tracks and audio tracks are similarly formed. As shown in FIGS. 10(E) and 10(F), timings of recording of the PCM audio signals are determined by second PCM head switching pulses SW2. As shown in FIG. 10(D), since the SP heads 211 and 213 are not used to record the PCM audio signals, a first PCM head switching signal SW1 is held at a low level state.

During a long-play reproducing mode of operation of the apparatus, the first channel EP head 212 reproduces a PCM audio signal 301b at a timing determined by the second PCM head switching signal SW2. The reproduced PCM audio signal 301b is processed by the demodulator 416 into corresponding data. The data are written into the memory 417. Reference clocks for the data writing into the memory 417 are generated by the combination of the PLL circuit 418 and the clock generator 419 on the basis of the horizontal sync signal fH in a video signal which is reproduced simultaneously with the reproduction of the PCM audio signal. The data are transferred from the memory 417 to the RAM 421. As shown in FIGS. 10(F) and 10(G), after the PCM audio signal 301b is reproduced, the data represented by the reproduced PCM audio signal 301b are subjected to the error detection and correction process by the error correction circuit 422. The error corrected data are converted into corresponding two channel analog audio signals as in the standard-play playback mode of operation of the apparatus. As shown in FIGS. 10(G) and 10(H), after the error detection and correction process ends, the two channel audio signals are outputted.

A second embodiment of this invention will be described hereinafter with reference to FIGS. 11–13. The second embodiment is similar to the embodiment of FIGS. 4–10 except for the following design changes.

Figure 11:
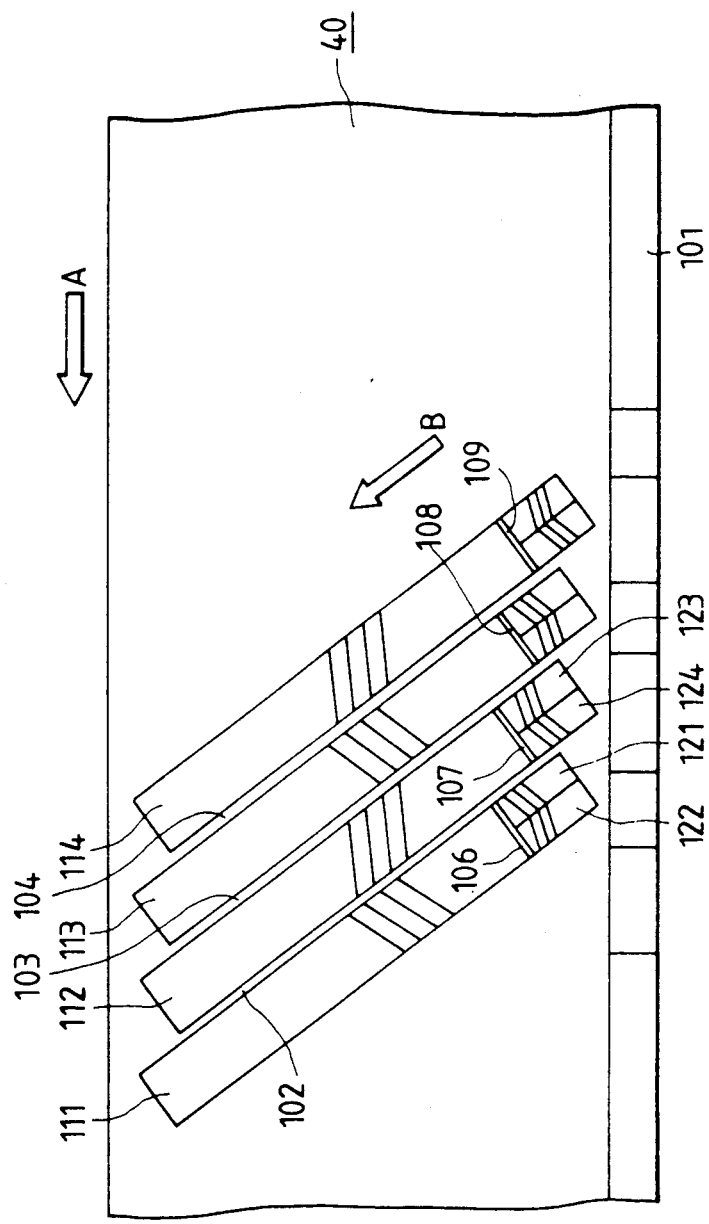
FIG. 11 is a diagram of a track pattern formed on a magnetic tape during a standard-play recording mode of operation of a second embodiment of this invention.

In the second embodiment, as shown in FIG. 11, audio tracks 121–124 are formed on a magnetic tape 40 before the formation of related video tracks 111–114 respectively so that the audio tracks 121–124 extend in regions lower than the video tracks 111–114.

Figure 12:
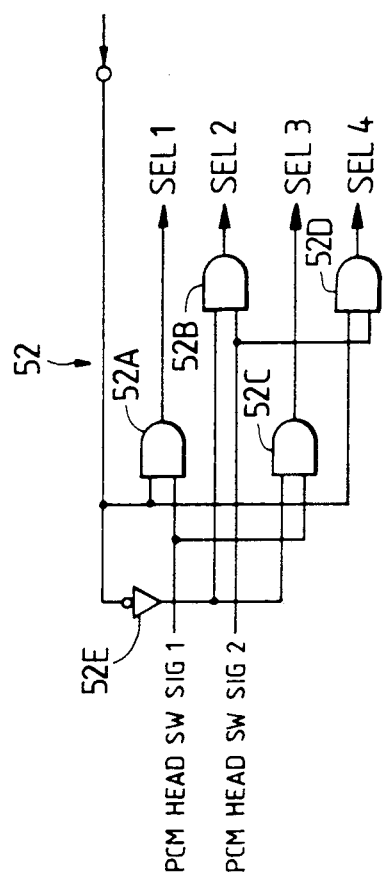
FIG. 12 is a block diagram of a signal change control section in the second embodiment.
Figure 13:
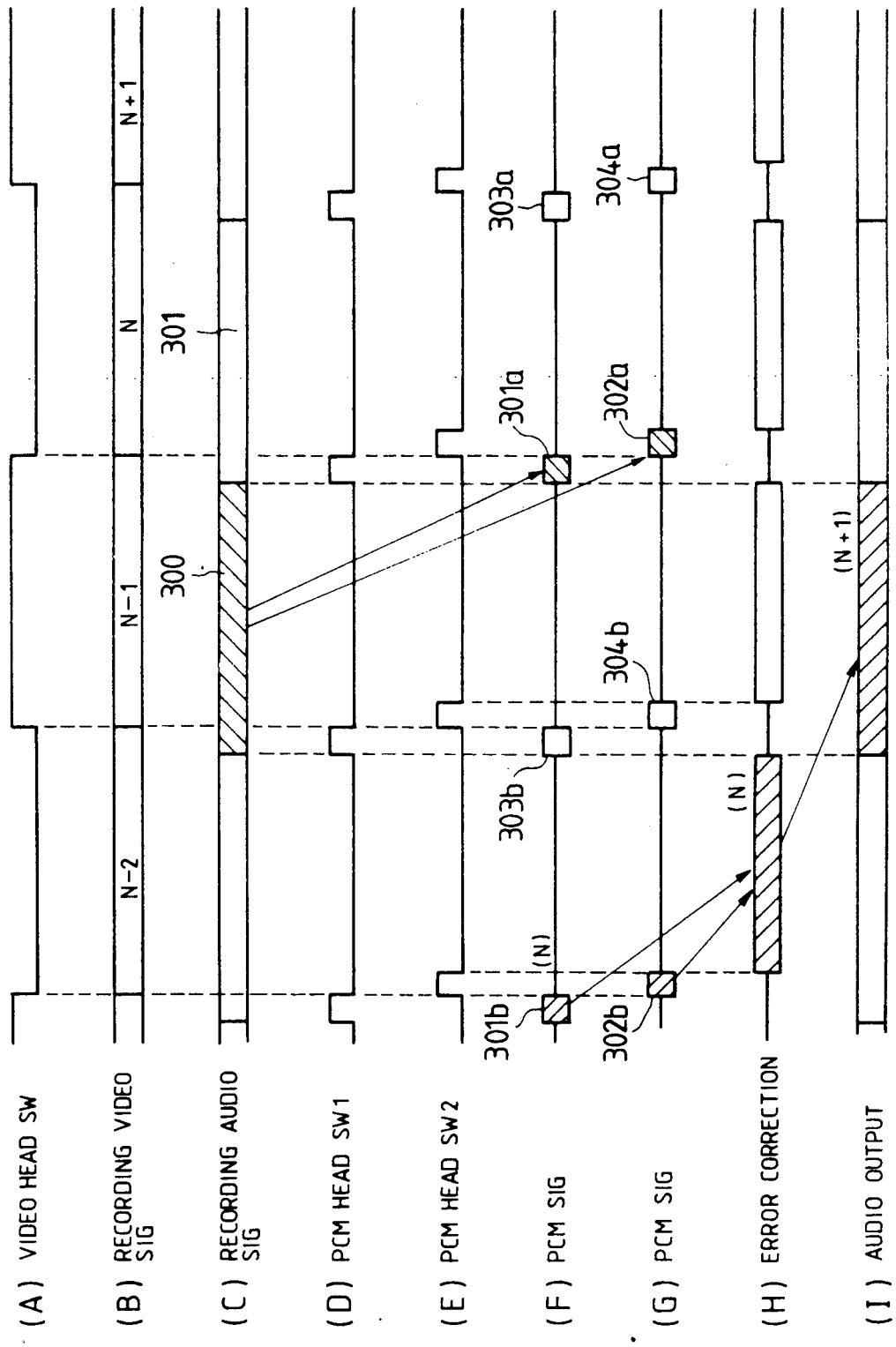
FIG. 13(A-I) is a timing diagram of various signals and processes in the second embodiment.

As shown in FIG. 12, a signal change control section 52 corresponding to the signal change control section 51 of FIG. 4 includes gates 52A–52D and an inverter 52E. First input terminals of the gates 52A and 52D and an input terminal of the inverter 52E are subjected to a video head switching signal (see FIG. 13(A)) supplied from a video signal processing circuit 30 (see FIG. 4). A second input terminal of the gate 52A is subjected to a PCM head switching signal SW1 (see FIG. 13(D)). The gate 52A outputs a control signal SEL1 to a switch 412 (see FIG. 4). A second input terminal of the gate 52D is subjected to a PCM head switching signal SW2 (see FIG. 13(E)). The gate 52D outputs a control signal SEL4 to a switch 415 (see FIG. 4). An output signal from the inverter 52E is applied to first input terminals of the gates 52B and 52C. A second input terminal of the gate 52B is subjected to the PCM head switching signal SW2 (see FIG. 13(E)). The gate 52B outputs a control signal SEL2 to a switch 413 (see FIG. 4). A second input terminal of the gate 52C is subjected to the PCM head switching signal SW1 (see FIG. 13(D)). The gate 52C outputs a control signal SEL3 to a switch 414 (see FIG. 4).

During a standard-play recording mode of operation of the second embodiment, an audio signal 300 of FIG. 13(C) is subjected to signal processing such as analog-to-digital conversion, frequency compression, and time division multiplexing, so that the audio signal 300 is separated and converted into PCM audio signals 301a and 302a of FIGS. 13(F) and 13(G). Immediately after the PCM audio signal 301a is recorded on the audio track 121 via a magnetic head 211 (see FIGS. 4–6) of a standard width, the PCM audio signal 302a is written over a portion of the previously-formed audio track 121 of the PCM audio signal 301a and is thereby recorded on the newly-formed audio track 122 via a magnetic head 212 (see FIGS. 4–6) of a small width. The recording of the PCM audio signal 302a is followed by a formation of a guard band 106. After the formation of the guard band 106, a video signal N of FIG. 13(B) is recorded via the magnetic head 211 so that the video track 111 is formed.

Similarly, immediately after a PCM audio signal 303a (see FIG. 13(F)) is recorded on the audio track 123 via a magnetic head 213 (see FIGS. 4–6) of a standard width, a PCM audio signal 304a (see FIG. 13(G) is a written over a portion of the previously-formed audio track 123 of the recored PCM audio signal 303a and is thereby recorded on the newly-formed audio track 124 via a magnetic head 214 (see FIGS. 4–6) of a small width. The recording of the PCM audio signal 304a is followed by a formation of a guard band 107. After the formation of the guard band 107, a video signal N+1 of FIG. 13(B) is recorded via the magnetic head 213 so that the video track 112 is formed.

During a standard-play playback mode of operation of the second embodiment, activated magnetic heads are selected in accordance with the video head switching signal (see FIG. 13(A)) and the PCM heads switching signals SW1 and SW2 (see FIGS. 13(D) and 13(E)) in a manner similar to the magnetic head selection during the standard-play recording mode of operation. As shown in FIGS. 13(F) and 13(G), portions 301b and 302b of a recorded PCM audio signal are sequentially reproduced via the magnetic heads 211 and 212 respectively. As shown in FIG. 13(H), during a period subsequent to the reproduction of the recorded PCM audio signal portion 302b, the audio data represented by the PCM audio signal portions 301b and 302b are subjected to the error detection and correction process. As shown in FIG. 13(I), during a period subsequent to the period of the error detection and correction process, the accurate reproduced audio signal corresponding to the PCM audio signal portions 301b and 302b is outputted. Similarly, subsequent portions 303b and 304b of the recorded PCM audio signal are sequentially reproduced via the magnetic heads 213 and 214 respectively and are subjected to the error detection and correction process.

A third embodiment of this invention will be described hereinafter with reference to FIGS. 14–16. The third embodiment is similar to the embodiment of FIGS. 4–10 except for the following design changes.

Figure 14:
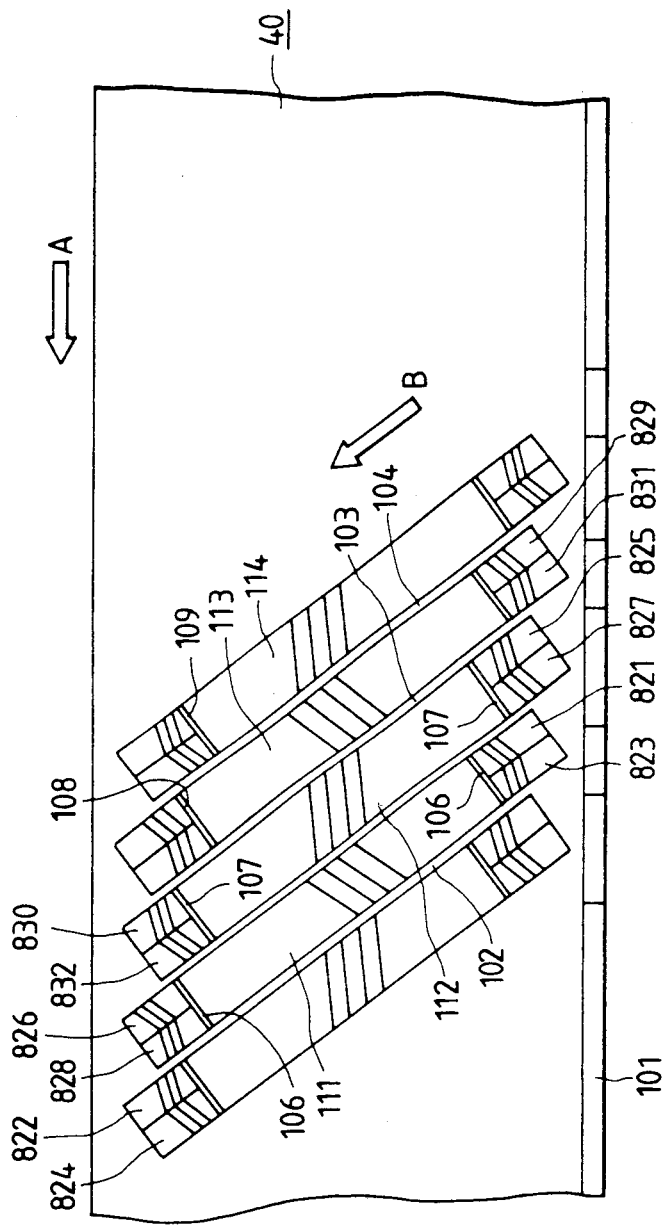
FIG. 14 is a diagram of a track pattern formed on a magnetic tape during a standard-play recording mode of operation of a third embodiment of this invention.

In the third embodiment, as shown in FIG. 14, audio tracks 821–832 are formed in regions above and below video tracks 111–114.

In the third embodiment, an arrangement of magnetic heads 211–214 (see FIGS. 4–6) is modified as follows. The angular spacing between the magnetic heads 211 and 212 is chosen to correspond to a time which is required to form the upper and lower audio tracks 821 and 822 by the preceding magnetic head 211 prior to the formation of the audio tracks 823 and 824 by the magnetic head 212, that is, which is the sum of the periods of the formation of the audio tracks 821 and 822. The angular spacing between the magnetic heads 213 and 214 is designed similarly.

Figure 15:
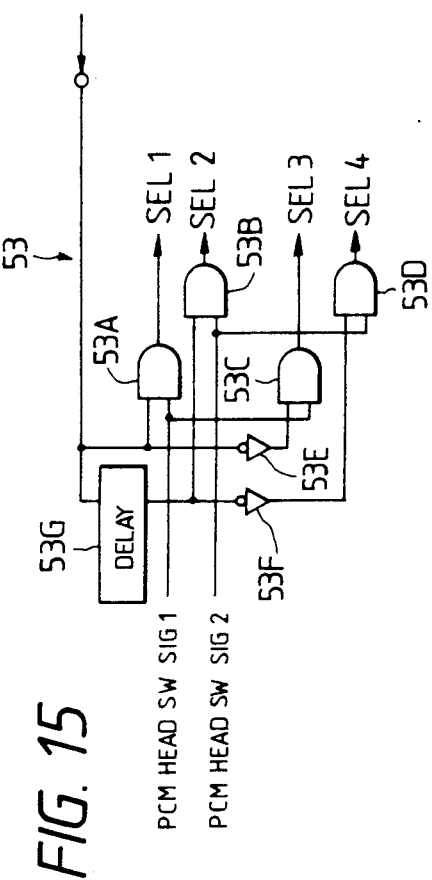
FIG. 15 is a block diagram of a signal change control section in the third embodiment.

As shown in FIG. 15, a signal change control section 53 corresponding to the signal change control section 51 of FIG. 4 includes gates 53A–53D, inverters 53E and 53F, and a delay circuit 53G. A first input terminal of the gate 53A and input terminals of the gate 53E and the delay circuit 53G are subjected to a video head switching signal (see FIG. 16(A)) supplied from a video signal processing circuit 30 (see FIG. 4). A second input terminal of the gate 53A is subjected to a PCM head switching signal SW1 (see FIG. 16(D)). The gate 53A outputs a control signal SEL1 to a switch 412 (see FIG. 4). An output signal (see FIG. 16(A') from the delay circuit 53G is applied to an input terminal of the inverter 53F and a first input terminal of the gate 53B. A second input terminal of the gate 53B is subjected to a PCM head switching signal SW2 (see FIG. 16(E)). The gate 53B outputs a control signal SEL2 to a switch 413 (see FIG. 4). An output signal from the inverter 53E is applied to a first input terminal of the gate 53C. A second input terminal of the gate 53C is subjected to the PCM head switching signal SW1 (see FIG. 16(D)). The gate 53C outputs a control signal SEL3 to a switch 414 (see FIG. 4). An output signal from the inverter 53F is applied to a first input terminal of the gate 53D. A second input terminal of the gate 53D is subjected to the PCM head switching signal SW2 (see FIG. 16(E)). The gate 53D outputs a control signal SEL4 to a switch 415 (see FIG. 4).

During a standard-play recording mode of operation of the third embodiment, an audio signal 300 of FIG. 16(C) is subjected to signal processing such as analog-to-digital conversion, frequency compression, and time division multiplexing, so that the audio signal 300 is separated and converted into PCM audio signals 901-904 of FIGS. 16(F) and 16(G). Immediately after the PCM audio signal 901 is recorded on the audio track 821 via the magnetic head 211 (see FIGS. 4–6) of a standard width, the PCM audio signal 902 is recorded on the audio track 822 via the magnetic head 213 (see FIGS. 4–6) of a standard width. Subsequently, the PCM audio signal 903 is written over a portion of the previously-formed audio track 821 and is recorded on the newly-formed audio track 823 by the magnetic head 212 (see FIGS. 4–6) of a small width. After the formation of the audio track 823, the PCM audio signal 904 is written over a portion of the previously-formed audio track 822 and is recorded on the newly-formed audio track 824 by the magnetic head 214 (see FIGS. 4–6) of a small width. At essentially the same moment as the moment of the start of the formation of the audio track 824, a lower guard band 106 is formed and a video signal N of FIG. 16(B) starts to be recorded via the magnetic head 211.

The video track 111 is formed as the recording of the video signal N of FIG. 16(B) is performed.

Similarly, immediately after the PCM audio signal 905 is recorded on the audio track 825 via the magnetic head 213 (see FIGS. 4–6), the PCM audio signal 906 is recorded on the audio track 826 via the magnetic head 211 (see FIGS. 4–6). Subsequently, the PCM audio signal 907 is written over a portion of the previously-formed audio track 825 and is recorded on the newly-formed audio track 827 by the magnetic head 214 (see FIGS. 4–6). After the formation of the audio track 827, the PCM audio signal 908 is written over a portion of the previously-formed audio track 826 and is recorded on the newly-formed audio track 828 by the magnetic head 212 (see FIGS. 4–6). At essentially the same moment as the moment of the start of the formation of the audio track 828, a lower guard band 107 is formed and a video signal N+1 of FIG. 16(B) starts to be recorded via the magnetic head 213. During the recording of the video signal N+1 of FIG. 16(B), the video track 112 is formed.

Figure 16:
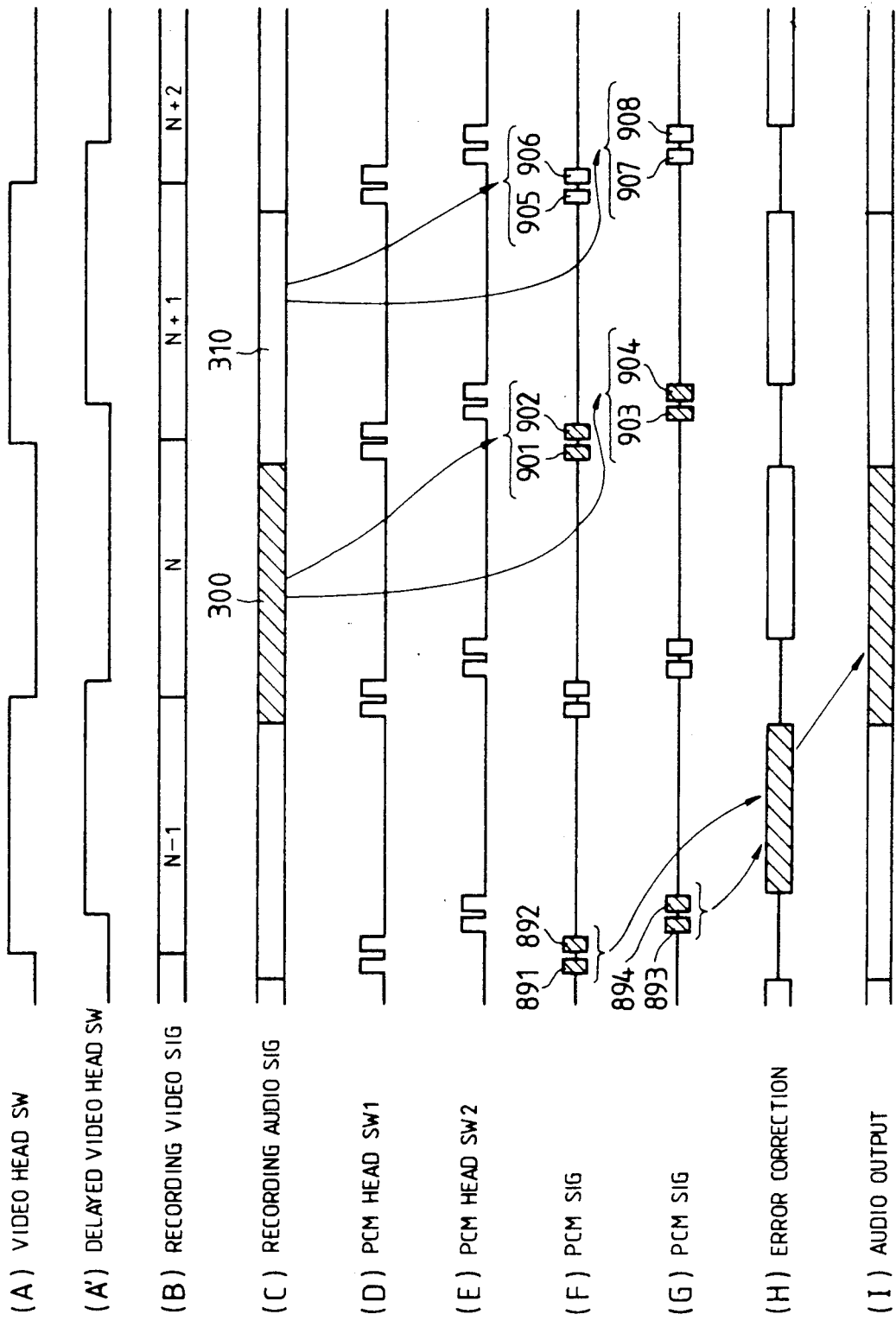
FIG. 16(A, A', B-I) is a timing diagram of various signals and processes in the third embodiment.

During a standard-play playback mode of operation of the third embodiment, activated magnetic heads are selected in accordance with the video head switching signal (see FIG. 16(A)), the delayed video head switching signal (see FIG. 16(A')), and the PCM head switching signals SW1 and SW2 (see FIGS. 16(D) and 16(E)) in a manner similar to the magnetic head selection during the standard-play recording mode of operation. As shown in FIG. 16(F), portions 891 and 892 of a recorded PCM audio signal are sequentially reproduced via the magnetic heads 211 and 213 respectively. As shown in FIG. 16(G), portions 893 and 894 of the recorded PCM audio signal are sequentially reproduced via the magnetic heads 212 and 214 respectively. As shown in FIG. 16(H), during a period subsequent to the reproduction of the recorded PCM audio signal portion 894, the audio data represented by the PCM audio signal portions 891-894 are subjected to the error detection and correction process. As shown in FIG. 16(I), during a period subsequent to the period of the error detection and correction process, the accurate reproduced audio signal corresponding to the PCM audio signal portions 891-894 is outputted.

In a modification of the embodiment of FIGS. 14–16, a modulator 409 (see FIG. 4) has two separate output terminals via which the PCM audio signals 901 and 902 are simultaneously outputted to the magnetic heads 211 and 213 respectively, and via which the PCM audio signals 903 and 904 are simultaneously outputted to the magnetic heads 212 and 214 respectively. In this modification, the lower and upper audio tracks 821 and 822 are formed simultaneously and the lower and upper audio tracks 823 and 824 are formed simultaneously, and the angular spacing between the magnetic heads 211 and 212 and the angular spacing between the magnetic heads 213 and 214 can be made smaller.

A fourth embodiment of this invention will be described hereinafter with reference to FIGS. 17–21. The fourth embodiment is similar to the embodiment of FIGS. 4–10 except for the following design changes.

In the fourth embodiment, as shown in FIG. 18, magnetic heads 211–216 are mounted on a rotary drum 200 designed to rotate in a direction C. The magnetic heads 211 and 212 are located near a point Y of an intersection between a circumference and a diametrical line l with respect to the rotary drum 200. The magnetic heads 213 and 214 are located near a point X of an opposite intersection between the circumference and the diametrical line l. Accordingly, the magnetic heads 211 and 212 are close to each other. The magnetic heads 213 and 214 are close to each other. The magnetic heads 211 and 213 are spaced by an angle of 180° with respect to the rotary drum 200. Similarly, the magnetic heads 212 and 214 are spaced by an angle of 180° with respect to the rotary drum 200. The magnetic heads 211, 212, 213, and 214 are assigned to a first channel in a standard play (SP) mode, a second channel in a extended play (EP) mode, a second channel in the SP mode, and a first channel in the EP mode, respectively where a group of heads for the first channel and another group of heads for the second channel are located opposite each other to scan respective tracks alternately. The magnetic heads 215 and 216 precede the intersection points X and Y respectively by a predetermined angle θ with respect to the rotary drum 200. The magnetic heads 215 and 216 are designed for audio recording. As shown in FIG. 19, the position of lower edges of the EP heads 212 and 214 is essentially equal to the position of lower edges of the SP heads 211 and 213 in height measured along an axis of the rotary drum 200. The position of lower edges of the audio heads 215 and 216 is higher than the position of lower edges of the SP heads 211 and 213 by a predetermined distance "h" measured along the axis of the rotary drum 200. The distance "h" is chosen to essentially agree with the width of the SP heads 211 and 213. The first channel SP head 211 and the first channel EP head 214 have azimuth angles of +6°. The second channel EP head 212 and the second channel SP head 213 have azimuth angles of −6°. The audio heads 215 and 216 have azimuth angles of +30° and −30° respectively. This design of the rotary drum 200 and the magnetic heads 211-216 enables the apparatus to be compatible with one of the industry standard VTR systems. The SP heads 211 and 213 have a standard width and are normally used to record and reproduce a video signal in a standard mode. The EP heads 212 and 214 have approximately a half of the standard width and are normally used to record and reproduce a video signal in a long play mode such as a three-times play mode. The audio heads 215 and 216 are used to record an FM audio signal or a PCM audio signal into a deep layer of a magnetic tape. The arrangement of the rotary drum 200 and the magnetic heads 211-216 is generally similar to the arrangement of a rotary drum and magnetic heads in a conventional VTR. Accordingly, the conventional VTR drum and heads can basically be applicable to this embodiment.

Figure 17:
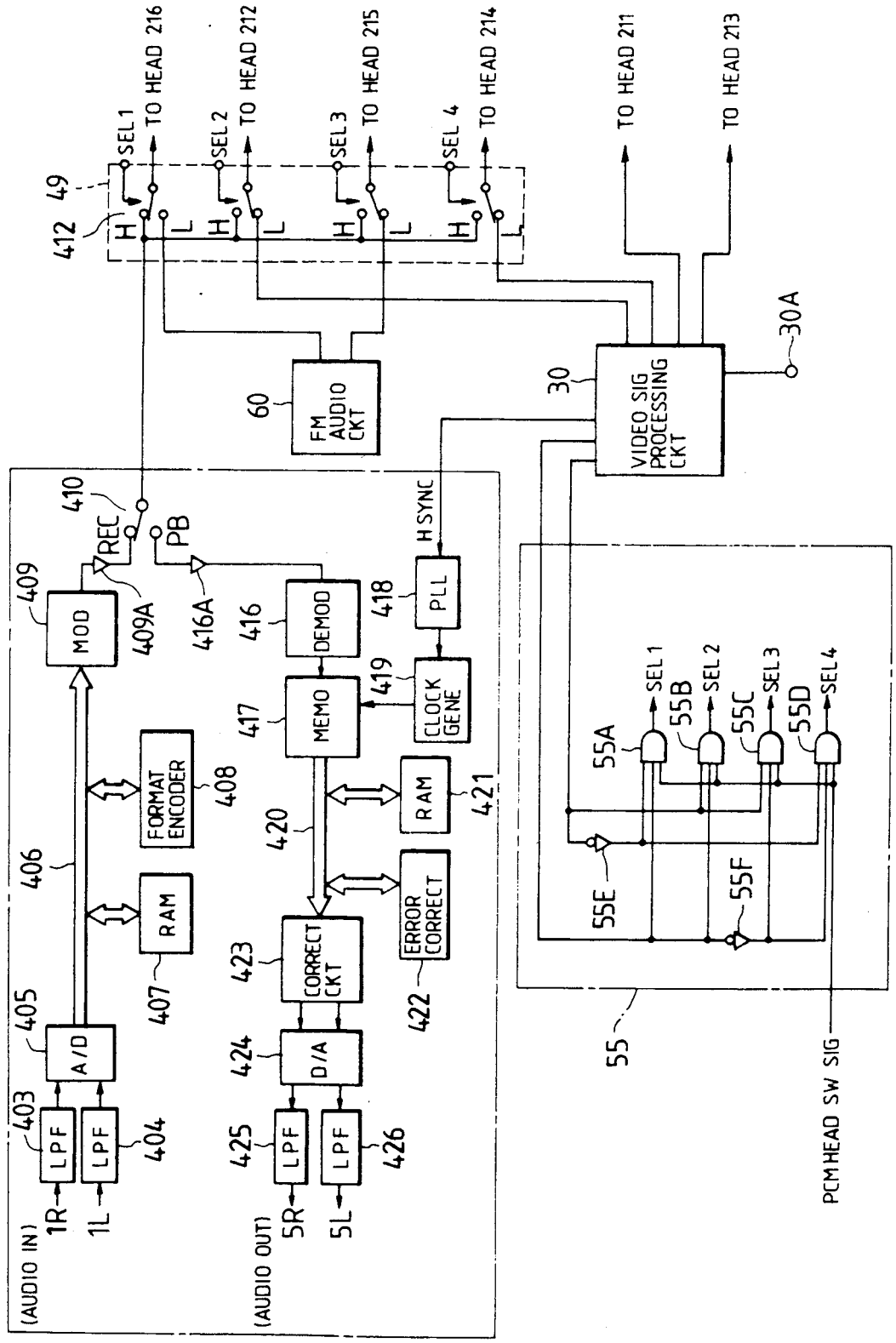
FIG. 17 is a block diagram of a magnetic recording and reproducing apparatus according to a fourth embodiment of this invention.

As shown in FIG. 17, during a recording mode of operation of the apparatus, a "REC" contact is selected in a switch 410 so that a PCM audio signal is transmitted from a modulator 409 to switches 412-415 of a signal change section 49 via a recording amplifier 409A and the switch 410. The switches 412, 413, 414, and 415 are connected via rotary transformers (not shown) to the second channel audio head 216, the second channel EP head 212, the first channel audio head 215, and the first channel EP head 214 respectively. The switches 412-415 are changed in response to respective control signals SEL1-SEL4 supplied from a signal change control section 55. During a standard-play recording mode of operation of the apparatus, the PCM audio signal is sequentially supplied to the magnetic heads 212, 215, 214, and 216 through the switches 412-415. During a standard-play playback mode of operation of the apparatus, a "PB" contact is selected in the switch 410 so that reproduced PCM audio signals are transmitted from the magnetic heads 212, 215, 214, and 216 to a demodulator 416 via the switches 412-415 and a reproducing amplifier 416A.

A conventional video signal processing circuit 30 is connected to the switches 413 and 415. During a long-play mode of operation of the apparatus, recording video signals or reproduced video signals are transmitted between the video signal processing circuit 30 and the EP heads 212 and 214 via the switches 413 and 415. The video signal processing circuit 30 is connected to the SP heads 211 and 213. During a standard-play mode of operation of the apparatus, recording video signals or reproduced video signals are transmitted between the video signal processing circuit 30 and the SP heads 211 and 213.

A known FM audio circuit 60 is connected to the switches 412 and 414. During the standard-play recording mode of operation of the apparatus, FM audio signals are sequentially transmitted from the FM audio circuit 60 to the magnetic heads 215 and 216 via the switches 412 and 414. During the standard-play playback mode of operation of the apparatus, reproduced FM audio signals are sequentially transmitted from the magnetic heads 215 and 216 to the FM audio circuit 60 via the switches 412 and 414.

During the standard-play or long-play playback mode of operation of the apparatus, the switches 413 and 415 select the PCM audio signals, the FM audio signals, and the video signals and pass the selected signals to the magnetic heads 216, 212, 215, and 214 in response to the control signals SEL1-SEL4 from the signal change control section 55. Accordingly, the PCM audio signals, the FM audio signals, and the video signals are selectively recorded on the magnetic tape 40 (see FIG. 20). The control signals SEL1-SEL4 are generated by the signal change control section 55 in accordance with a PCM head switching pulse signal SW (see FIG. 21(F)) supplied to the signal change control section 55 and a video head switching pulse signal of FIG. 21(A) which is outputted from the video signal processing circuit 30. During the standard-play playback mode of operation of the apparatus, the video signal processing circuit 30 outputs video signals to the magnetic heads 211 and 213 via rotary transformers (not shown). These video signals are recorded on the magnetic tape 40 (see FIG. 20) via the magnetic heads 211 and 213.

During the standard-play playback mode of operation of the apparatus, PCM audio signals are reproduced from the magnetic tape 40 (see FIG. 20) via the magnetic heads 216, 212, 215, and 214. The reproduced PCM audio signals are selected by the switches 412-415 at timings as shown in FIGS. 21(A), 21(B), 21(F), and 21(J) and are sequentially transmitted to a demodulator 416 via a reproducing amplifier 416A.

During the standard-play playback mode of operation of the apparatus, video signals are reproduced from the magnetic tape 40 (see FIG. 20) via the magnetic heads 211 and 213. The reproduced video signals are transmitted to the video signal processing circuit 30. The video signal processing circuit 30 derives a composite video signal from the reproduced video signals.

As shown in FIG. 17, the signal change control section 55 which corresponds to the circuit 51 of FIG. 4 includes gates 55A-55D and inverters 55E and 55F. First input terminals of the gates 55B and 55C and an input terminal of the inverter 55E are subjected to a video head switching pulse signal (see FIG. 21(A)) supplied from the video signal processing circuit 30. First input terminals of the gates 55A and 55D are subjected to an output signal from the inverter 55E. Second input terminals of the gates 55A and 55B and an input terminal of the inverter 55F are subjected to an audio head switching pulse signal (see FIG. 21(B)) supplied from the video signal processing circuit 30. The audio head switching signal of FIG. 21(B) is advanced in phase relative to the video head switching signal of FIG. 21(A) by a value corresponding to the head spacing angle $\theta$. Second input terminals of the gates 55C and 55D are subjected to an output signal from the inverter 55F. Third input terminals of the gates 55A-55D are subjected to a PCM head switching pulse signal (see FIG. 21(F)) which is generated on the basis of drum pulses synchronous with the rotation of the rotary drum 200. It should be noted that the PCM head switching pulse signal of FIG. 21(F) can be generated by combining the audio head switching signals SW1 and SW2 of the embodiment of FIGS. 4-10 through an OR gate and by modifying the delay times in the delay circuits. The gates 55A-55D output the control signals SEL1-SEL4 to the switches 412-415 respectively. In this way, the signal change control section 55 generates the control signals SEL1-SEL4 in accordance with the video head switching signal (see FIG. 21(A)), the audio head switching signal (see FIG. 21(B)), and the PCM head switching signal (see FIG. 21(F)).

As shown in FIG. 20, a control track 101 is formed along an edge of the magnetic tape 40. The control track holds a control signal which is used in tracking control during the playback mode of operation of the apparatus. In FIG. 20, the arrow A denotes a tape running direction, and the arrow B denotes a head scanning direction. During the standard-play recording mode of operation of the apparatus, inclined video tracks are formed on the magnetic tape 40 by the magnetic heads 211 and 213. The reference numerals 111-114 denote some of these video tracks. Audio tracks are formed on the magnetic tape 40 by the magnetic heads 212, 214, 215, and 216. The reference numerals 121-128 denote some of these audio tracks. A pair of audio tracks reside in an area extending from the upper end of each of the video tracks. An FM audio signal is precedingly recorded into deep layer portions of the video tracks by the magnetic heads 215 and 216 according to a known method. This design enables the apparatus to be compatible with one of the conventional Hi-Fi audio VTR systems. The video tracks 111-114 are spaced from the related audio tracks 121-128 by guard bands 106-109. The audio tracks 122 and 124 adjacent to the audio track 121 have azimuth angles different from an azimuth angle of the audio track 121 so that crosstalks between the audio tracks 121 and 122, and between audio tracks 121 and 124 develop only an negligible levels. In this way, adjacent audio tracks in general have different azimuth angles respectively so that only a negligible crosstalk develops therebetween. Although the video track 111 and the audio track 124 have the same azimuth angles, the carrier frequency band of the video signal recorded in the video track 111 differs from the carrier frequency band of the PCM audio signal recorded in the audio track 124 so that a crosstalk between the video track 111 and the audio track 124 causes only a negligible interference.

Figure 21:
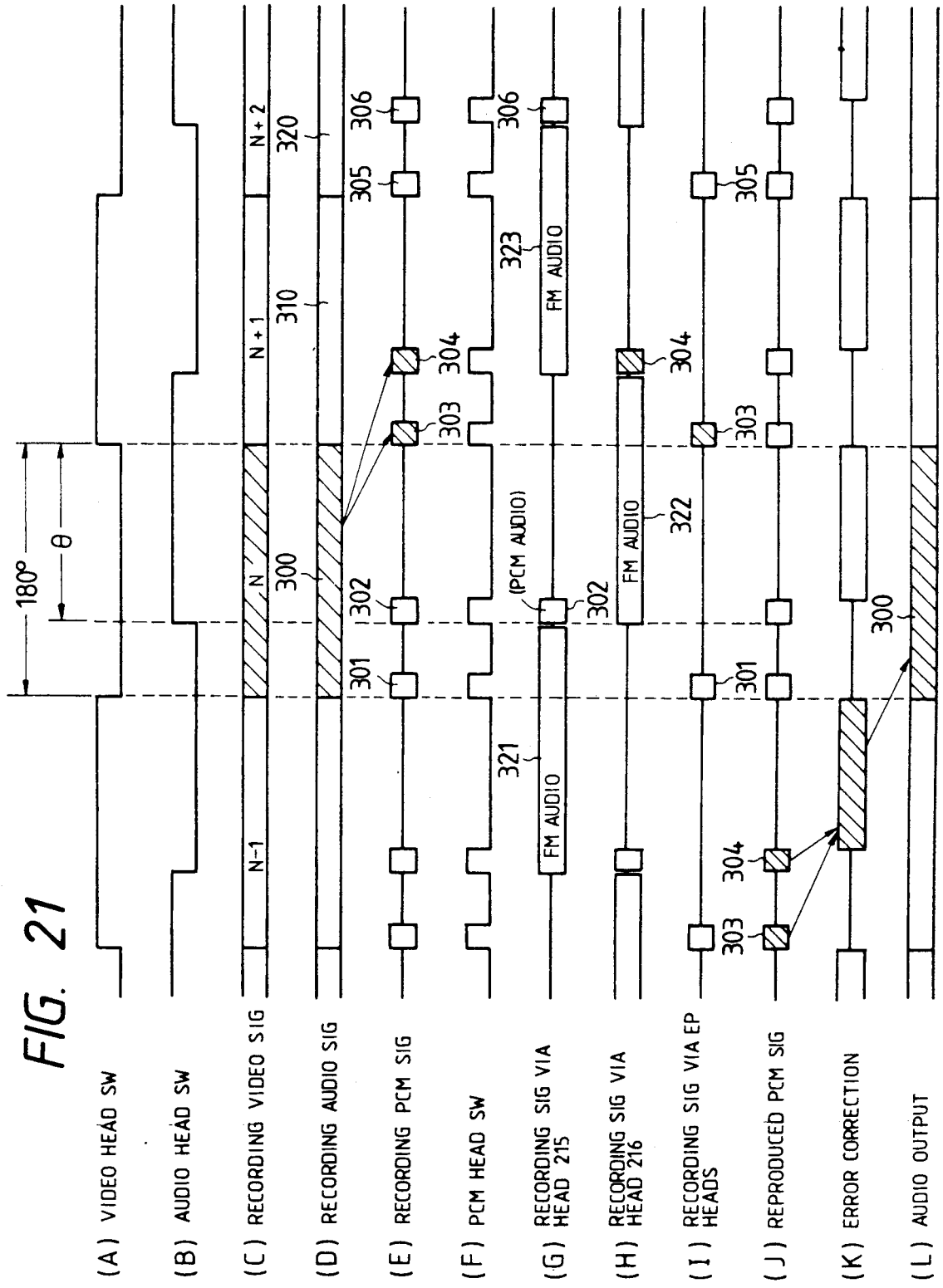
FIG. 21(A-L) is a timing diagram of various signals and processes in standard-play recording and reproducing modes of operation of the embodiment of FIG. 17.

The operation of the fourth embodiment will be further described with reference to FIGS. 20 and 21.

During the standard-play recording mode of operation of the apparatus, an N-th field of the video signal shown in FIG. 21(C) is recorded via the first channel SP head 211 so that a video track 111 (see FIG. 20) is formed. As shown in FIGS. 21(D) and 21(E), the portion 300 of the audio signal, which corresponds to the N-th field of the video signal, is compressed into portions 303 and 304 of the PCM audio signal. After the formation of the video track 111 (see FIG. 20), an (N+1)-th field of the video signal of FIG. 21(C) is recorded via the second channel SP head 213 so that a video track 112 (see FIG. 20) is formed. During the formation of the video track 112, the portion 303 of the PCM audio signal is written over a portion of a preceding audio track 121 and is thus recorded by the EP head 212 into an audio track 122. It should be noted that the audio track 121 extends above the video track 111. The timing of recording of the PCM audio signal portion 303 is determined in accordance with the video head switching signal of FIG. 21(A), the audio head switching signal of FIG. 21(B), and the PCM head switching signal of FIG. 21(F). Specifically, when all of these head switching signals (see FIGS. 21(A), 21(B), and 21(F)) assumes high level states, the control signal SEL2 operates the switch 413 (see FIG. 17) to pass the PCM audio signal portion 303 to the magnetic head 212 so that the PCM audio signal portion 303 is recorded via the magnetic head 212. Subsequently, the portion 304 of the PCM audio signal is recorded by the audio head 215 into an audio track 123 which extends above the video track 112. The timing of recording of the PCM audio signal portion 304 is determined in accordance with the video head switching signal of FIG. 21(A), the audio head switching signal of FIG. 21(B), and the PCM head switching signal of FIG. 21(F). Specifically, when the video head switching signal of FIG. 21(A) and the PCM head switching signal of FIG. 21(F) assume high level states but the audio head switching signal of FIG. 21(B) assumes a low level state, the control signal SEL3 operates the switch 414 (see FIG. 17) to pass the PCM audio signal portion 304 to the magnetic head 215 so that the PCM audio signal portion 304 is recorded via the magnetic head 215. During one field period which immediately precedes the period of recording of the PCM signal portion 304 via the audio head 215, the audio head 215 records the FM audio signal 322 (see FIG. 21(H)) into a deep layer portion of a video track 112.

After the formation of the video track 112 (see FIG. 20), an (N+2)-th field of the video signal of FIG. 21(C) is recorded via the first channel SP head 211 so that a video track 113 (see FIG. 20) is formed. During the formation of the video track 113, a portion 305 of the PCM audio signal which corresponds to the (N+1)-th field of the video signal (see FIG. 21(C)) is written over a portion of the preceding audio track 123 and is thus recorded by the EP head 214 into an audio track 124. The timing of recording of the PCM audio signal portion 305 is determined in accordance with the video head switching signal of FIG. 21(A), the audio head switching signal of FIG. 21(B), and the PCM head switching signal of FIG. 21(F). Specifically, when the video head switching signal of FIG. 21(A) and the audio head switching signal of FIG. 21(B) assume low level states but the PCM head switching signal of FIG. 21(F) assumes a high level state, the control signal SEL4 forces the switch 415 (see FIG. 17) to pass the PCM audio signal portion 305 to the magnetic head 214 so that the PCM audio signal portion 305 is recorded via the magnetic head 214. Subsequently, another portion 306 of the PCM audio signal which corresponds to the (N+1)-th field of the video signal (see FIG. 21(C)) is recorded by the audio head 216 into an audio track 125 which extends above the video track 113. The timing of recording of the PCM audio signal portion 306 is determined in accordance with the video head switching signal of FIG. 21(A), the audio head switching signal of FIG. 21(B), and the PCM head switching signal of FIG. 21(F). Specifically, when the video head switching signal of FIG. 21(A) assumes a low level state bu the audio head switching signal of FIG. 21(B) and the PCM head switching signal of FIG. 21(F) assume high level states, the control signal SEL1 operates the switch 412 (see FIG. 17) to pass the PCM audio signal portion 306 to the magnetic head 216 so that the PCM audio signal portion 306 is recorded via the magnetic head 216. During one field period which immediately precedes the period of recording of the PCM signal portion 306 via the audio head 216, the audio head 216 records the FM audio signal 323 (see FIG. 21(G)) into a deep layer portion of the video track 113. Similar processes are reiterated so that subsequent audio tracks 126–128 are formed in regions above video tracks 113 and 114.

During the standard-play playback mode of operation of the apparatus, activated magnetic heads are selected in accordance with the video head switching signal (see FIG. 21(A)), the audio head switching signal (see FIG. 21(B)), and the PCM head switching signal (see FIG. 21(F)) in a manner similar to the magnetic head selection during the standard-play recording mode of operation. As shown in FIG. 21(J), portions 303 and 304 of a recorded PCM audio signal are sequentially reproduced via the magnetic heads 212 and 215 respectively. As shown in FIG. 21(K), during a period subsequent to the reproduction of the recorded PCM audio signal portion 304, the audio data represented by the PCM audio signal portions 303 and 304 are subjected to the error detection and correction process. As shown in FIG. 21(L), during a period subsequent to the period of the error detection and correction process, the accurate reproduced audio signal corresponding to the PCM audio signal portions 303 and 304 is outputted in the form of a reproduced audio signal 300. Similarly, subsequent portions of the recorded PCM audio signal are sequentially reproduced via the magnetic heads 214 and 216 respectively and are subjected to the error detection and correction process.

It should be noted that audio tracks may be formed in regions below related video tracks before the formation of the related video tracks. In addition, audio tracks may be formed in regions above and below related video tracks.

A fifth embodiment of this invention will be described hereinafter with reference to FIGS. 22–25. The fifth embodiment is similar to the embodiment of FIGS. 4–10 except for the following design changes.

In the fifth embodiment, as shown in FIG. 23, magnetic heads 211–215 are mounted on a rotary drum 200 designed to rotate in a direction C. The magnetic heads 211 and 212 are located near a point X of an intersection between a circumference and a diametrical line 1 with respect to the rotary drum 200. The magnetic heads 213 and 214 are located near a point Y of an opposite intersection between the circumference and the diametrical line 1. Accordingly, the magnetic heads 211 and 212 are close to each other. The magnetic heads 213 and 214 are close to each other. The magnetic heads 211 and 213 are spaced by an angle of 180° with respect to the rotary drum 200. Similarly, the magnetic heads 212 and 214 are spaced by an angle of 180° with respect to the rotary drum 200. The magnetic heads 211, 212, 213, and 214 are designed for a first channel in a standard play (SP) mode, a second channel in a extended play (EP) mode, a second channel in the SP mode, and a first channel in the EP mode, respectively. The magnetic head 215 is retardedly spaced from the first channel SP head 211 by a predetermined angle $\theta$ with respect to the rotating direction of the rotary drum 200. The magnetic head 215 is designed for recording a PCM audio signal. As shown in FIG. 24, the position of lower edges of the EP heads 212 and 214 is essentially equal to the position of lower edges of the SP heads 211 and 213 in height measured along an axis of the rotary drum 200. The position of a lower edge of the PCM head 215 is higher than the position of lower edges of the SP heads 211 and 213 by a predetermined distance "h" measured along the axis of the rotary drum 200. The distance "h" is chosen to essentially agree with a half of a width of the SP heads 211 and 213. A width of the PCM head 215 is essentially equal to a half of the width of the SP heads 211 and 213. The first channel SP head 211 and the first channel EP head 214 have azimuth angles of +6°. The second channel EP head 212 and the second channel SP head 213 have azimuth angles of −6°. The SP heads 211 and 213 have a standard width and are normally used to record and reproduce a video signal in a standard mode. The EP heads 212 and 214 have approximately a half of the standard width and are normally used to record and reproduce a video signal in a long play mode such as a three-times play mode. This arrangement of the SP and EP heads enables the apparatus of the fifth embodiment to be compatible with one of the conventional VTR systems operable in both of a standard play mode and a long play mode. The PCM head 215 has an azimuth angle of −6°.

Figure 22:
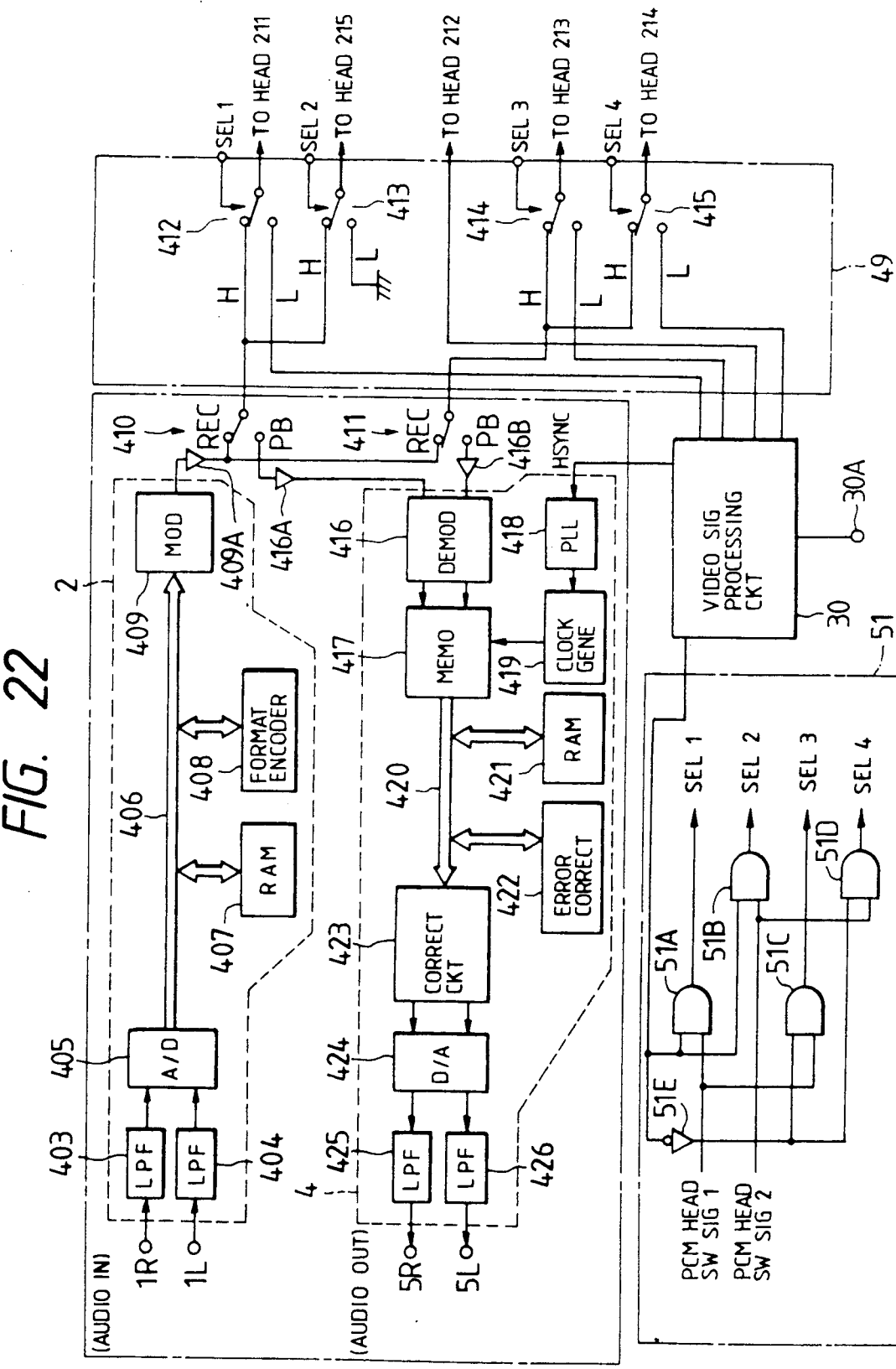
FIG. 22 is a block diagram of a magnetic recording and reproducing apparatus according to a fifth embodiment of this invention.

As shown in FIG. 22, switches 412–415 of a signal change section 49 are connected via rotary transformers (not shown) to the first channel SP head 211, the PCM head 215, the second channel SP head 213, and the first channel EP head 214 respectively. The switch 413 is supplied with only a PCM audio signal and a ground potential. The second channel EP head 212 is connected to a video signal processing circuit 30 so that a recording video signal or a reproduced video signal can be transmitted between the second channel EP head 212 and the video signal processing circuit 30.

Operation of the fifth embodiment is basically similar to the operation of the embodiment of FIGS. 4–10 except that the SP head 215 of the fifth embodiment serves as the magnetic head 212 of the embodiment of FIGS. 4–10. The operation of the fifth embodiment will be specifically described hereinafter.

As shown in FIG. 25, during the standard-play recording mode of operation of the apparatus, an N-th field of the video signal is recorded via the first channel SP head 211 into a video track 111. The PCM audio signal which corresponds to the N-th field of the video signal is compressed into two portions. After the formation of the video track 111, an (N+1)-th field of the video signal is recorded via the second channel SP head 213 into a video track 112. During the formation of the video track 112, the first PCM audio signal portion which corresponds to the (N+1)-th field of the video signal is recorded via the first channel SP head 211 into an audio track 121 above the video track 111. At this moment, a width of the audio track 121 is equal to a width of the video track 111. Subsequently, the second PCM audio signal portion which corresponds to the (N+1)-th field of the video signal is written over a half of the audio track 121 and is recorded via the PCM head 215 into an audio track 122. The positional relationship between the audio tracks 121 and 122 is inverse with respect to that of the embodiment of FIGS. 4-10. The time interval from the moment of the end of recording of the N-th field video signal to the moment of the start of recording of the second PCM audio signal portion corresponds to the angular spacing $\theta$ between the magnetic heads 211 and 215.

A sixth embodiment of this invention will be described hereinafter with reference to FIGS. 26 and 27. The sixth embodiment is similar to the embodiment of FIGS. 4-10 except for the following design changes.

Figure 26:
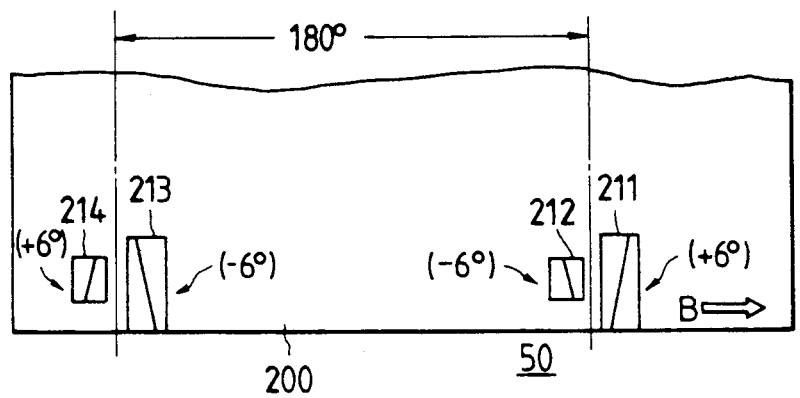
FIG. 26 is a developed side view of a rotary drum and magnetic heads in a sixth embodiment of this invention.

In the sixth embodiment, as shown in FIG. 26, centers of EP heads 212 and 214 essentially agree with centers of SP heads 211 and 213 in height measured along an axis of a rotary drum.

Figure 27:
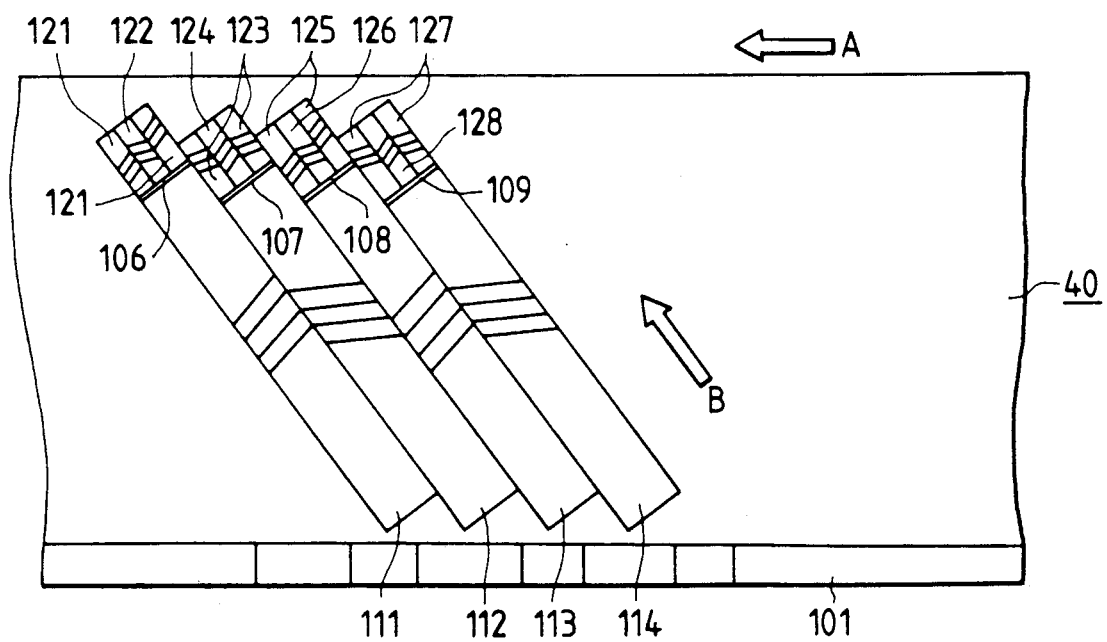
FIG. 27 is a diagram of a track pattern formed on a magnetic tape during a standard-play recording mode of operation of the sixth embodiment.

As shown in FIG. 27, an audio track 122 is formed along a central line of a precedingly formed audio track 121 in an overwriting manner so that the audio track 122 separates the audio track 121 into two portions. Other pairs of audio tracks have an arrangement similar to the arrangement of the pair of these audio tracks 121 and 122.

What is claimed is:

1. An apparatus comprising:
   (a) a rotary drum on which a magnetic tape is wound through a predetermined angular range greater than a standard tape winding angle, the predetermined angular range having a first portion corresponding to the standard tape winding angle and a second portion extending outward of the standard tape winding angle;
   (b) first means for recording a main information signal forming a main information recording track on the magnetic tape, the main information recording track extending in a region corresponding to the first portion of the predetermined angular range;
   (c) second means for recording a sub information signal forming a sub information recording track on the magnetic tape, the sub information recording track extending along an extension line of the main information recording track and extending in a region corresponding to the second portion of the predetermined angular range;
   wherein the second recording means comprises a plurality of magnetic heads having different track widths respectively and mounted on the rotary drum, and means for enabling the magnetic heads to form a plurality of respective paths which together constitute the sub information signal recording track.

2. The apparatus of claim 1 wherein the main information signal includes a video signal, and the sub information signal includes a digitized audio signal.

3. The apparatus of claim 1 wherein the sub information recording track is located adjacent to one end of the main information recording track.

4. The apparatus of claim 1 wherein the sub information recording track is divided into two portions which are located adjacent to respective ends of the main information recording track.

5. The apparatus of claim 1 further comprising means for reproducing the recorded main information signal, and means for reproducing the recorded sub information signal.

6. An apparatus comprising:
   (a) a rotary drum on which a magnetic tape is wound through a predetermined angular range greater than a standard tape winding angle, the predetermined angular range having a first portion corresponding to the standard tape winding angle and a second portion extending outward of the standard tape winding angle;
   (b) first and second standard play heads mounted on the rotary drum and spaced from each other by an angle of 180°, the standard play heads having a standard width;
   (c) first and second extended play heads mounted on the rotary drum and being adjacent to the respective standard play heads, the extended play heads having a width smaller than the standard width, wherein lower edges of the extended play heads are substantially aligned with the lower edges of the standard play heads in height measured along an axis of the rotary drum;
   (d) first and second magnetic heads mounted on the rotary drum and spaced from the respective standard play heads by a predetermined angular interval, the magnetic heads having azimuth angles different from azimuth angles of the extended play heads, wherein lower edges of the magnetic heads are positioned higher that the lower edges of the first and second standard play heads along the axis of the rotary drum and are at such heights that track portions which remain by subsequent overwriting by the extended play heads will have track widths which are adequate for recording and reproduction; and
   means for controlling the heads such that each of the standard play heads forms a main signal recording track on the magnetic tape in a region corresponding to the first portion of the predetermined angular range, and the magnetic heads form first sub information recording tracks on the magnetic tape in regions extending along an extension line of the main information recording tracks and corresponding to the second portion of the predetermined angular range, and wherein the extended play heads which have an azimuth angle different from an azimuth angle of said magnetic heads, form second sub information recording tracks over a portion of the first sub information recording tracks, and thus the first and second sub information recording tracks which have different azimuth angles are formed along an extension line of the main information signal recording tracks.

7. The apparatus of claim 6 wherein the main information signal recording track holds a video signal, and the first and second sub information recording tracks hold digitized audio signals.

8. The apparatus of claim 7 further comprising means for reproducing the video signal, and means for reproducing the digitized audio signals.

9. An apparatus comprising:
   (a) a rotary drum on which a magnetic tape is wound through a predetermined angular range greater than a standard tape winding angle, the predetermined angular range having a first portion corresponding to the standard tape winding angle and a second portion extending outward of the standard tape winding angle;

(b) first and second standard play heads mounted on the rotary drum and spaced from each other by an angle 180°, the standard play heads having different azimuth angles;

(c) a magnetic head mounted on the rotary drum and having an azimuth angle different from the azimuth angle of the first standard play head, the magnetic head being positioned following the first standard play head with respect to a direction of rotation of the rotary drum and being spaced from the first standard play head by a predetermined angular interval, the magnetic head having a width smaller than a width of the first standard play head, wherein an edge of the magnetic head is substantially aligned with an edge of the first standard play head in height measured along an axis of the rotary drum;

(d) an extended play head mounted on the rotary drum and being positioned adjacently following the second standard play head with respect to the direction of the rotation of the rotary drum, the extended play head having a width smaller than a width of the second standard play head and having an azimuth angle different from the azimuth angle of the second standard play head, wherein an edge of the extended play head is substantially aligned with an edge of the second standard play head in height measured along the axis of the rotary drum; and means for controlling the heads such that the first standard play head forms a first-main information recording track on the magnetic tape in a region corresponding to the first portion of the predetermined angular range, and subsequently the first standard play head forms a first sub information recording track on the magnetic tape in a region extending along an extension line of the first main information recording track and corresponding to the second portion of the predetermined angular range, wherein the magnetic head forms a second sub information recording track over a half of the first sub information recording track, wherein the second standard play head forms a second main information recording track on the magnetic tape in a region corresponding to the first portion of the predetermined angular range, and subsequently the second standard play head forms a third sub information recording track on the magnetic tape in a region extending along an extension line of the second main information recording track and corresponding to the second portion of the predetermined angular range, wherein the extended play head forms a fourth sub information recording track over a half of the third sub information recording track, and wherein the first and second sub information recording tracks which have different azimuth angles are formed along an extension line of the first main information recording track, and the third and fourth sub information recording tracks which have different azimuth angles are formed along an extension line of the second main information recording track.

10. The apparatus of claim 9 wherein the first and second main information recording tracks holds video signals, and the first, second, third, and fourth sub information recording tracks hold digitized audio signals.

11. The apparatus of claim 10 further comprising means for reproducing the video signals, and means for reproducing the digitized audio signals.

12. The apparatus of claim 9 further comprising a second extended play head mounted on the rotary head and being positioned adjacent to the first standard play head, wherein during a long-play recording mode of operation, the first and second extended play heads alternately form main information tracks in regions corresponding to the first portion of the predetermined angular range, wherein during the long-play recording mode of operation, after one of the first and second extended play heads forms a main information track, the same extended play head forms a sub information track in a region extending along an extension line of the main information track.

* * * * *